(12) United States Patent
Tanahashi et al.

(10) Patent No.: US 6,237,504 B1
(45) Date of Patent: May 29, 2001

(54) GUIDEWAY TRANSIT SYSTEM AND AUTOMATED VEHICLE USED IN THIS SYSTEM

(75) Inventors: Toshio Tanahashi, Susono; Norihiko Nakamura, Mishima; Keiji Aoki; Hiromitsu Kimpara, both of Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/407,951

(22) Filed: Sep. 28, 1999

(30) Foreign Application Priority Data

Sep. 29, 1998 (JP) ................................. 10-276014
Jun. 11, 1999 (JP) ................................. 11-165027

(51) Int. Cl.$^7$ ................................................. B61B 12/00
(52) U.S. Cl. .................... 104/243; 104/247; 180/167; 180/168; 180/401; 701/23; 701/41
(58) Field of Search .............................. 104/88.01, 88.02, 104/88.04, 130.07, 288, 242, 243, 244.1, 247; 180/167, 168, 169, 170, 171, 401, 402; 701/23, 26, 41, 93

(56) References Cited

U.S. PATENT DOCUMENTS

| | | | | |
|---|---|---|---|---|
| 3,393,762 | * | 7/1968 | Matson ................................. | 180/168 |
| 3,724,584 | * | 4/1973 | Varichon ............................ | 104/244.1 |
| 3,845,719 | * | 11/1974 | Langdon .............................. | 104/247 |
| 3,977,487 | * | 8/1976 | Katayose et al. .................. | 104/244.1 |
| 4,015,539 | * | 4/1977 | Hamada ............................. | 104/244.1 |
| 4,092,930 | * | 6/1978 | Takemura et al. ................... | 104/247 |
| 4,265,180 | * | 5/1981 | Uozumi ................................ | 104/247 |
| 4,274,338 | * | 6/1981 | Uozumi ................................ | 104/247 |
| 4,299,172 | * | 11/1981 | Dawson .............................. | 104/247 |
| 4,301,739 | * | 11/1981 | Mehren et al. ....................... | 104/247 |
| 4,436,170 | * | 3/1984 | Mehren et al. ....................... | 104/247 |
| 5,318,143 | * | 6/1994 | Parker et al. ......................... | 180/168 |
| 5,357,432 | * | 10/1994 | Margolis et al. .................... | 180/168 |
| 5,373,911 | * | 12/1994 | Yasui .................................... | 180/168 |
| 5,390,118 | * | 2/1995 | Margolis et al. .................... | 180/168 |
| 5,485,378 | * | 1/1996 | Franke et al. ......................... | 180/168 |
| 5,575,217 | * | 11/1996 | Vincent-Genod .................... | 104/247 |
| 5,774,069 | * | 6/1998 | Tanaka et al. ....................... | 180/167 |
| 5,781,119 | * | 7/1998 | Yamashita et al. .................. | 180/168 |

OTHER PUBLICATIONS

"Computer Simulation of Lateral Guidance System for Automated Guideway Transit Vehicles", Tsunashima and Fukumoto, Kobe Steel Engineering Reports, vol. 37, No. 4 (1987) pp. 16–19.

\* cited by examiner

*Primary Examiner*—S. Joseph Morano
*Assistant Examiner*—Lars A. Olson
(74) *Attorney, Agent, or Firm*—Pillsbury Winthrop LLP

(57) ABSTRACT

A guideway transit system which can reduce a scale of an infrastructure while maintaining ride comfort for passengers of a vehicle is provided. The guideway transit system includes a noncontact vehicle guiding system and a contact vehicle guiding system. The noncontact vehicle guiding system detects information relating to a lateral position of a vehicle on a road and steers the vehicle to move along a predetermined path on the road based on the detected information. The contact vehicle guiding system which restricts a lateral position of the vehicle by a contact between a guide wheel which laterally projects from the vehicle and a guide wall provided on a side of the road. The guideway transit system further includes a controller which prohibits steering of the vehicle by the noncontact vehicle guiding system when a lateral position of the vehicle is restricted by the contact vehicle guiding system. An automated vehicle which is used in the guideway transit system is also provided.

35 Claims, 17 Drawing Sheets

GUIDEWAY TRANSIT SYSTEM AND AUTOMATED VEHICLE USED IN THIS SYSTEM

BACKGROUND OF THE INVENTION

1. Field of the Invention

The present invention is related to a guideway transit system which guides a vehicle by holding a guide wheel provided on the vehicle in contact with a guide wall provided on a side of a road, and to an automated vehicle used in such a guideway transit system

2. Description of the Related Art

Conventionally, as shown in FIG. 1, there is known a guideway transit system which guides a vehicle by constraining guide wheels which laterally project from both sides of the vehicle between guide walls provided on both sides of a road ("Computer Simulation of Lateral Guidance System for Automated Guideway Transit Vehicles", Tsunashima and Fukumoto, KOBE STEEL ENGINEERING REPORTS, Vol. 37, No. 4 (1987)).

In this system, guide wheels 21a, 21b, which are connected to each other by a shaft, are provided on a front part of a vehicle 10. The guide wheels 21a, 21b laterally project from both sides of the vehicle 10 and are constrained between guide walls (not shown) which are provided on both sides of a road R. The shaft connecting the guide wheels 21a, 21b is connected to front wheels 11a, 11b, which are steered wheels, of the vehicle 10 via a link mechanism 20. In this system, rear wheels 12a, 12b are not connected to the guide wheels 21a, 21b.

When the guide wheels 21a, 21b, which are in contact with the guide walls, move with the shaft in accordance with a shape of the road R, a relative position of the guide wheels 21a, 21b and the vehicle 10 changes. In this case, the link mechanism functions to steer the front wheels 11a, 11b in accordance with the change in the relative position. Thus, the vehicle 10 can always run along a predetermined path defined on the road R.

In the above-mentioned conventional guideway transit system, since the vehicle is steered by always holding the guide wheels in contact with the guide walls, the guide walls must be provided with relatively high positional accuracy over a whole part of the road on which the vehicle should run. As a length of the road on which the vehicle should run increases, a larger cost is required to construct an infrastructure since it becomes more difficult to provide the guide walls with relatively high accuracy over a whole part of the road.

Additionally, since the vehicle runs with the guide wheels being in contact with the guide walls provided on both sides of the road, vibrations are transmitted from the guide walls to the vehicle via the guide wheels, resulting in ride discomfort for passengers of the vehicle.

SUMMARY OF THE INVENTION

It is a first object of the present invention to provide a guideway transit system which can reduce a scale of an infrastructure while maintaining ride comfort for passengers of a vehicle.

It is a second object of the present invention to provide an automated vehicle which is used in such a guideway transit system.

The first object of the present invention can be achieved by a guideway transit system comprising:

a noncontact vehicle guiding system which detects information relating to a lateral position of a vehicle on a road and steers the vehicle to move along a predetermined path on the road based on the detected information;

a contact vehicle guiding system which restricts a lateral position of the vehicle by a contact between a guide wheel which laterally projects from the vehicle and a guide wall provided on a side of the road; and a controller which prohibits the steering of the vehicle by the noncontact vehicle guiding system when a lateral position of the vehicle is restricted by the contact vehicle guiding system.

In such a guideway transit system, in an area of the road where the noncontact vehicle guiding system operates, the vehicle is steered so as to run along the predetermined path based on the detected information relating to a lateral position of the vehicle without using the guide wheel provided on the vehicle. On the other hand, in an area of the road where the contact vehicle guiding system operates, a lateral position of the vehicle is restricted by the guide wheel, which laterally projects from the vehicle, being in contact with the guide wall provided on a side of the road, and steering of the vehicle by the noncontact vehicle guide system is prohibited. In this case, the vehicle is steered to maintain the lateral position restricted by the contact vehicle guiding system.

The area where the contact vehicle guiding system should operate may be set to be an area where a lateral position of the vehicle should be accurately controlled.

The area where the noncontact vehicle guiding system should operate is set to be an area where the vehicle regularly runs. Thus, vibrations can be prevented from being transmitted to the vehicle from the guide wall via the guide wheel in the regular situation.

Additionally, the contact vehicle guiding system may also operate when the vehicle deviates from the predetermined path due to a trouble in a steering control of the vehicle by the noncontact vehicle guiding system. In this case, the steering control of the vehicle by the noncontact vehicle guide system is prohibited, and, when the vehicle deviates from the predetermined path until the guide wheel comes into contact with the guide wall, a lateral position of the vehicle is restricted by a contact of the guide wheel and the guide wall. When a lateral position of the vehicle is restricted in this way, the vehicle is preferably braked by an emergency braking.

Considering the fact that the contact vehicle guiding system operates when the noncontact vehicle guiding system cannot normally steer the vehicle, it is necessary to provide the guide wall in the area where the noncontact vehicle guiding system should operate. Since the guide wall provided in the area where the noncontact vehicle guiding system should operate has a function of limiting a lateral position of the vehicle within a predetermined range, positional accuracy of the guide walls may be lower than that of the guide walls provided in the area where the contact vehicle guiding system should operate.

As mentioned above, since the noncontact vehicle guiding system regularly steers the vehicle and the contact vehicle guiding system operates only in an area where a lateral position of the vehicle should be accurately controlled, ride comfort for passengers of the vehicle can be maintained in the regular situation. Additionally, since the contact vehicle guiding system operates only when the vehicle cannot be guided along the path by the noncontact vehicle guiding system, accuracy of the guide wall need not be high. Thus, a scale of the infrastructure can be reduced.

The above-mentioned second object of the present invention can be achieved by an automated vehicle, comprising:

a lateral position detector which detects a lateral position of the vehicle on a road;

an automatic steering mechanism which steers the vehicle based on the position detected by the lateral position detector so that the vehicle moves along a predetermined path on the road;

a guide wheel which laterally projects from a vehicle body; and an automatic steering prohibiting part which prohibits the automatic steering by the automatic steering mechanism when the vehicle is laterally constrained by the guide wheel being in contact with a guide wall which is provided on a side of the road.

In the guideway transit system, the guide wall may be provided on each side of the road and the guide wheel may be provided on each side of the vehicle.

In such a guideway transit system, since the guide wheels can be held between the guide walls, a lateral position of the vehicle is effectively restricted by the contact vehicle guiding system. In this case, a space between the guide walls in the area where the noncontact vehicle guiding system should operate may be set to be so large that the guide wheels of the vehicle are prevented from coming into contact with the guide walls.

In order that the vehicle can be easily steered by restricting a lateral position of the vehicle by the contact vehicle guiding system, the controller may comprise a constraint-canceling mechanism which can cancel constraint of a steered wheel by a steering mechanism which is controlled by the noncontact vehicle guiding system.

According to such a guideway transit system, since constraint of the steered wheel by the steering mechanism is canceled when the contact vehicle guiding system restricts a lateral position of the vehicle, a load of the steered wheel is decreased. As a result, a force required to restrict a lateral position of the vehicle becomes smaller, and thus the vehicle can be smoothly steered by the contact vehicle guiding system.

Additionally, in view of simplifying a structure of the contact vehicle guiding system, the guide wheel and a steered wheel steered by a steering mechanism which is controlled by the noncontact vehicle guiding system are mechanically disconnected from each other.

According to this guideway transit system, when a lateral position of the vehicle is restricted by a contact between the guide wall and the guide wheel in a state where a steering control of the vehicle by the noncontact vehicle guiding system is prohibited, a lateral force is exerted on the vehicle from the guide wall via the guide wheel. Due to this lateral force, the steered wheel which is mechanically disconnected from the guide wheel can be steered in a neutral direction (for example, a straight direction) by a self aligning force, without being excessively steered as compared to a case where the guide wheel and the steered wheel (front wheel, for example) are connected to each other by a link mechanism as shown in FIG. 1. In this way, the steered wheel can be naturally steered in a straight direction without a connection between the guide wheel and the steered wheel by a link mechanism.

Considering a fact that the vehicle stops at a station where passengers get on and off the vehicle, the contact vehicle guiding system may be provided in a predetermined area including a position at which the vehicle should be stopped.

In such a guideway transit system, when the vehicle enters the predetermined area including a position such as a station at which the vehicle should be stopped, a lateral position of the vehicle is restricted by the contact vehicle guiding system. Thus, it is possible to stop the vehicle at the station while accurately controlling a relative position of the vehicle and other structures such as a platform.

In order to more accurately control a lateral position of the vehicle by the contact vehicle guiding system in which the guide wheel is provided on each side of the vehicle, each of the guide wheels may be supported by a damper mechanism which generates a reaction force against a compression in a lateral direction of the vehicle.

According to such a guideway transit system, when the guide wheels laterally projecting from both sides of the vehicle are constrained between the guide walls, the damper mechanism is compressed. The damper mechanism generates a force against the compression, and this force is exerted on the vehicle from both sides thereof. Thus, a position of the vehicle can be controlled with higher accuracy.

In this case, a space between the guide walls may gradually decrease to a minimum value in a running direction of the vehicle.

In such a guideway transit system, when the vehicle is in a position where a space between the guide walls is the minimum value, a force generated by the damper mechanism is maximum since an extent of compression thereof is maximum. In this state, a lateral position of the vehicle is most accurately controlled. Since the space between the guide walls gradually decreases toward the position where the space is the minimum value in the running direction of the vehicle, an extent of compression of the damper mechanism gradually increases as the vehicle advances. Thus, the vehicle can smoothly enter the area where a lateral position thereof can be most accurately controlled, with an increasing lateral force exerted on the vehicle by the damper mechanism.

In order that the vehicle, which has stopped with the guide wheels being constrained between the guide walls, can smoothly start running in the guideway transit system in which the guide wheels are supported by the damper mechanisms, the guideway transit system may further comprise a damper-force changing mechanism which decreases the force generated by the damper mechanism when the vehicle, which has stopped with the guide wheels being constrained between the guide walls, starts running.

In such a guideway transit system, since the force laterally exerted on the vehicle by the damper mechanism is decreased when the vehicle starts running, the vehicle can smoothly start running.

In order to prevent a rapid change in a direction of the steered wheel when steering of the vehicle by the noncontact vehicle guiding system is prohibited and the vehicle starts being steered by the contact vehicle guiding system, a steering mechanism of the vehicle may comprise a steering damper mechanism which generates a force against a steering movement of a steered wheel of the vehicle, and the guideway transit system may further comprise a damper force adjuster which adjusts the force generated by the steering damper mechanism based on at least a steering angle of the steered wheel when the steering control by the noncontact vehicle guide system is prohibited.

In such a guideway transit system, when the steering control of the vehicle by the noncontact vehicle guiding system is prohibited and the vehicle starts being steered by the contact vehicle guiding system, a movement of the steered wheel is damped by the force generated by the steering damper mechanism against the movement. For example, if the steering control of the vehicle by the noncontact vehicle guiding system is prohibited when the vehicle is running on a curved road, a relatively large force is generated by the steering damper since a steering angle at that time is relatively large. As a result, a rapid change in a direction of the steered wheel from that large steering angle can be prevented, and thus the vehicle can run more stably.

The damper force adjuster adjusts the force generated by the steering damper mechanism at least based on the steering angle, as mentioned above. However, the damper force adjuster may adjust the force based on a running state such as a vehicle speed and an acceleration/deceleration, in addition to the steering angle. For example, the force generated by the steering damper mechanism may be adjusted to be larger for a higher vehicle speed if the steering angle is the same.

In order that the damper force adjuster can switch the force generated by the steering damper mechanism between two levels, the damper force adjuster may comprise:

a determining part which determines whether or not the force generated by the steering damper mechanism should be increased based on a criterion determined in accordance with at least the steering angle; and a force controller which increases the force generated by the steering damper mechanism when the determining part determines that the force generated by the steering damper mechanism should be increased.

The criterion which is used in the determining part is preferably determined based on whether or not the vehicle can stably run with a rate of change in a direction of the steered wheel steered by the contact vehicle guiding system against the force currently generated by the steering damper mechanism.

In order to reduce vibrations which are transmitted to the vehicle from the guide wall via the guide wheel, the guide wall may comprise a shock-absorbing member having a shock-absorbing function in a lateral direction of the road.

In such a guideway transit system, a shock generated by an impact between the guide wheel and the guide wall can be damped by the shock-absorbing function of the shock-absorbing member which constitutes the guide wall. Thus, vibrations transmitted to the vehicle from the guide wall via the guide wheel can be reduced.

In order to simply construct such a guide wall, the shock-absorbing member may comprise a belt-like member which moves in a direction in which the road extends.

In order that the vehicle can enter one of two branch roads in accordance with a steering control by the noncontact vehicle guiding system while being positively guided into that branch road if the vehicle laterally shifts toward the other branch road, the contact vehicle guiding system may include a branch-road guiding system which guides the vehicle into one of two branch roads by guiding a branch-road guide member provided ahead of front wheels on the vehicle along a branch wall provided at a border between the two branch roads.

In such a guideway transit system, the branch-road guide member of the vehicle may come into contact with the branch wall provided at the border between the two branch roads if the vehicle shifts toward the other branch road. In this case, a lateral force is exerted on the vehicle from the branch wall via the branch-road guide member. Thus, the vehicle can be guided into the desired branch road by the branch-road guide member being guided along the branch wall.

In order to maintain a wide vision area at a junction of the branch road, the branch wall may have a height which is smaller than a height of the guide wall.

In order that the vehicle can be smoothly guided into any one of the branch roads, the branch-road guide member may comprise a substantially U-shaped plate-like member having a convex shape at a front end part thereof.

In such a guideway transit system, when the vehicle enters a branch road branching to the right, a left side surface of the U-shaped plate-like member is guided along the branch wall. On the other hand, when the vehicle enters a branch road branching to the left, a right side surface of the U-shaped plate-like member is guided along the branch wall.

In order that the branch-road guide member can be smoothly guided along the branch wall, a strength of the branch-road guide member in a direction of contact with the branch wall may gradually increase toward the rear.

In such a guideway transit system, the vehicle is guided into one of the branch roads with the branch-road guide member sliding on the branch wall from a front end part toward the rear. If the front end part of the branch-road guide member impacts on the branch wall with a high speed, the impact part of branch-road guide member may be destroyed. In this case, as the branch-road guide member moves forward while sliding on the branch wall, an extent of the destruction becomes smaller due to the above-mentioned strength distribution. A force exerted on the vehicle body from the branch wall via the branch-road guide member becomes smaller in accordance with an increase in the extent of the destruction since the force is absorbed by the destruction of the branch-road guide member. Thus, according to the above-mentioned behavior of the branch-road guide member, the force exerted on the vehicle from the branch wall gradually increases as the vehicle advances so that the vehicle can be smoothly guided into one of the branch roads.

In order to simply construct the branch-road guide member having the above-mentioned strength distribution, the branch-road guide member may comprise:

a plate-like base body; and a plurality of force-adjusting plates layered on the base body with end parts of the force-adjusting plates being shifted one after another.

In such a guideway transit system, the number of the layered force-adjusting plates increases toward the rear side of the branch-road guide member. Thus, the strength of the branch-road guide member in a direction of contact with the branch wall gradually increases toward the rear.

In this case, the base body may have a honeycomb structure which has a relatively low strength in a direction of contact with the branch wall.

In order to prevent the vehicle from going over the branch wall if the branch wall is constructed to be low, contact surfaces of the branch wall and the branch-road guide member may be inclined so that the contact surface of the branch wall is above the contact surface of the branch-road guide member.

In such a guideway transit system, the branch-road guide member comes into contact with the branch wall from a lower side. In this case, the branch-road guide member fixed to the vehicle is pushed down by the branch wall. Thus, it is possible to prevent the vehicle from going over the branch wall if the branch wall is constructed to be low.

In order that the branch-road guide member can be stably guided along the branch wall if the vehicle body rolls when the vehicle enters a branch road, an inclination angle of the contact surface of the branch-road guide member may be set to be larger than an inclination angle of the contact surface of the branch wall.

Other objects and further features of the present invention will be apparent from the following detailed description when read in conjunction with the accompanying drawings.

DESCRIPTION OF THE PREFERRED EMBODIMENTS

Figure 1:
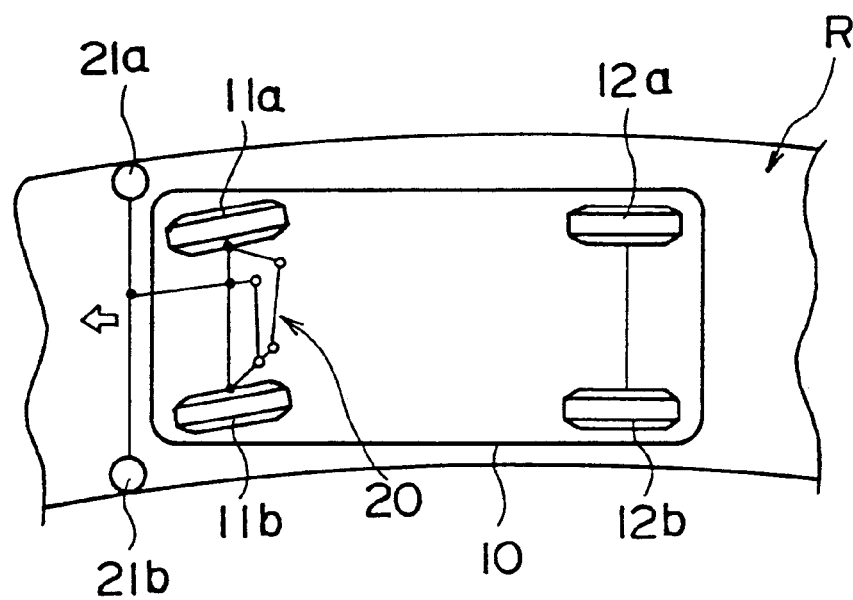
FIG. 1 is a diagram showing an example of a conventional guideway transit system.
Figure 2:
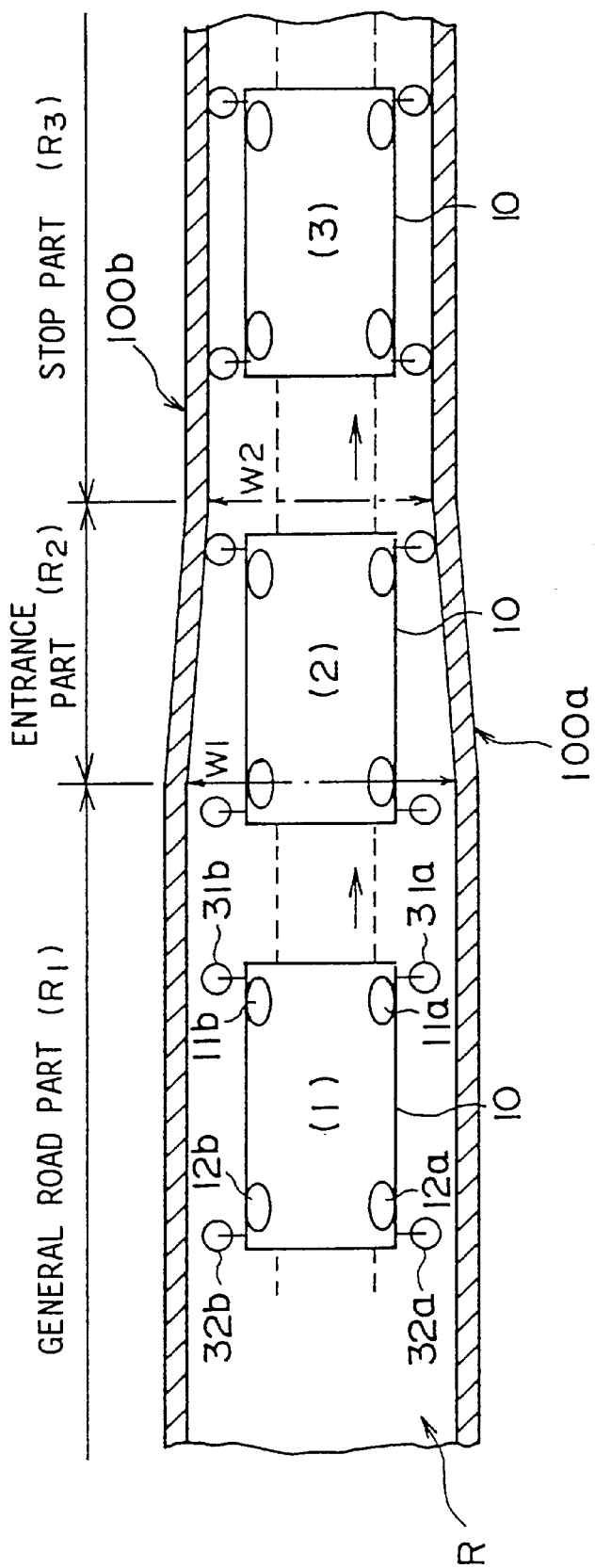
FIG. 2 is a diagram showing an example of a structure used in a guideway transit system according to an embodiment of the present invention.

FIG. 2 shows a guideway transit system according to an embodiment of the present invention. As shown in FIG. 2, guide walls 100a, 100b are provided on both sides of a road R. Each of the guide walls 100a, 100b has a height of approximately 60 centimeters, for example. The road R provided with the guide walls 100a, 100b comprises a general road part R1, an entrance part R2 and a stop part R3.

In the general road part R1, the guide walls 100a, 100b are provided in parallel with each other with a space W1. An automated vehicle (hereinafter simply referred to as a vehicle) 10 runs on a predetermined path between the guide walls 100a, 100b, as will be described later.

The stop part R3 is provided with a station (not shown) at which the vehicle 10 should stop. In the stop part R3, the guide walls 100a, 100b are provided in parallel with each other with a space W2 which is smaller than the space W1.

The vehicle 10 is controlled to stop at a predetermined position in the stop part R3.

The entrance part R2 connects the general road part R1 and the stop part R3. In the entrance part R2, a space between the guide walls 100a, 100b linearly changes from W1 at a side of the general road part R1 to W2 at a side of the stop part R3.

Although FIG. 2 shows only a part of the road R, the road R is actually constructed as a combination of a number of the general road parts R1, the entrance parts R2 and the stop parts R3. In this case, an exit side of the stop part R3 may be connected to a general road part R1 via a part like the entrance part R2 where a space between the guide walls 100a, 100b gradually increases, or may be directly connected to a general road part R1 without providing such a part where a space between the guide walls 100a, 100b gradually increases.

Magnetic markers, for example, which can be magnetically detected are provided at a predetermined lateral position (a center position, for example) of the road R at predetermined intervals (every one meter, for example). An arrangement of the magnetic markers corresponds to a path along which the vehicle 10 should run. Additionally, specific magnetic markers are provided at a boundary position between the general road part R1 and the entrance part R2, a position of the entrance part R2 at a predetermined distance before the stop part R3 (a station entrance mark), a position of the stop part R3 at which the vehicle 10 should stop (a stop mark) and a position at which the vehicle 10 leaves the stop part R3 (a station exit mark). These specific magnetic markers may be formed by combinations of N and S poles, for example, so that the respective positions can be identified.

Figure 3:
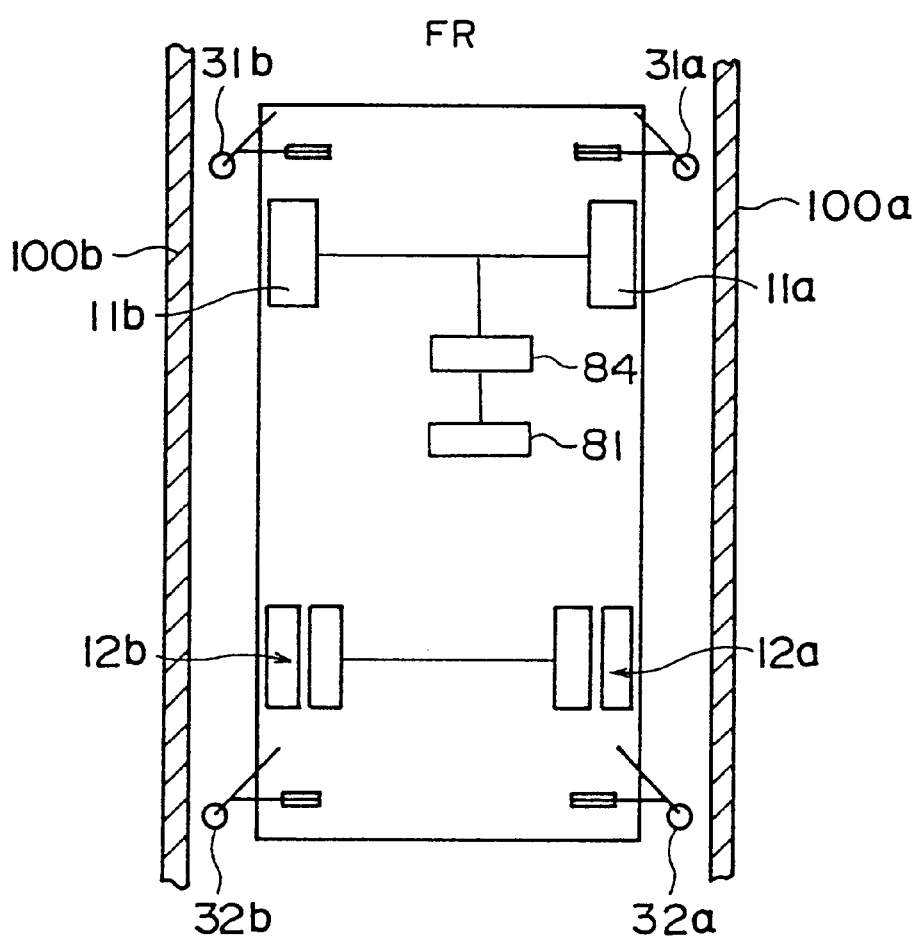
FIG. 3 is a diagram showing an example of a contact vehicle guiding system.

As shown in FIGS. 2 and 3, the vehicle 10 is provided with front guide wheels 31a, 31b and rear guide wheels 32a, 32b. The front guide wheels 31a, 31b laterally project from both sides of a front part FR of the vehicle 10 ahead of front wheels 11a, 11b, and the rear guide wheels 32a, 32b laterally project from both sides of the vehicle 10 behind rear wheels 12a, 12b. Heights of the front guide wheels 31a, 31b and the rear guide wheels 32a, 32b above ground are set to be lower than heights of the guide walls 100a, 100b. According to such a relationship in height, when the vehicle 10 moves closer to the guide wall 100a, the front guide wheel 31a and the rear guide wheel 32a come into contact with the guide wall 100a, and when the vehicle 10 moves closer to the guide wall 100b, the front guide wheel 31b and the rear guide wheel 32b come into contact with the guide wall 100b.

Figure 4:
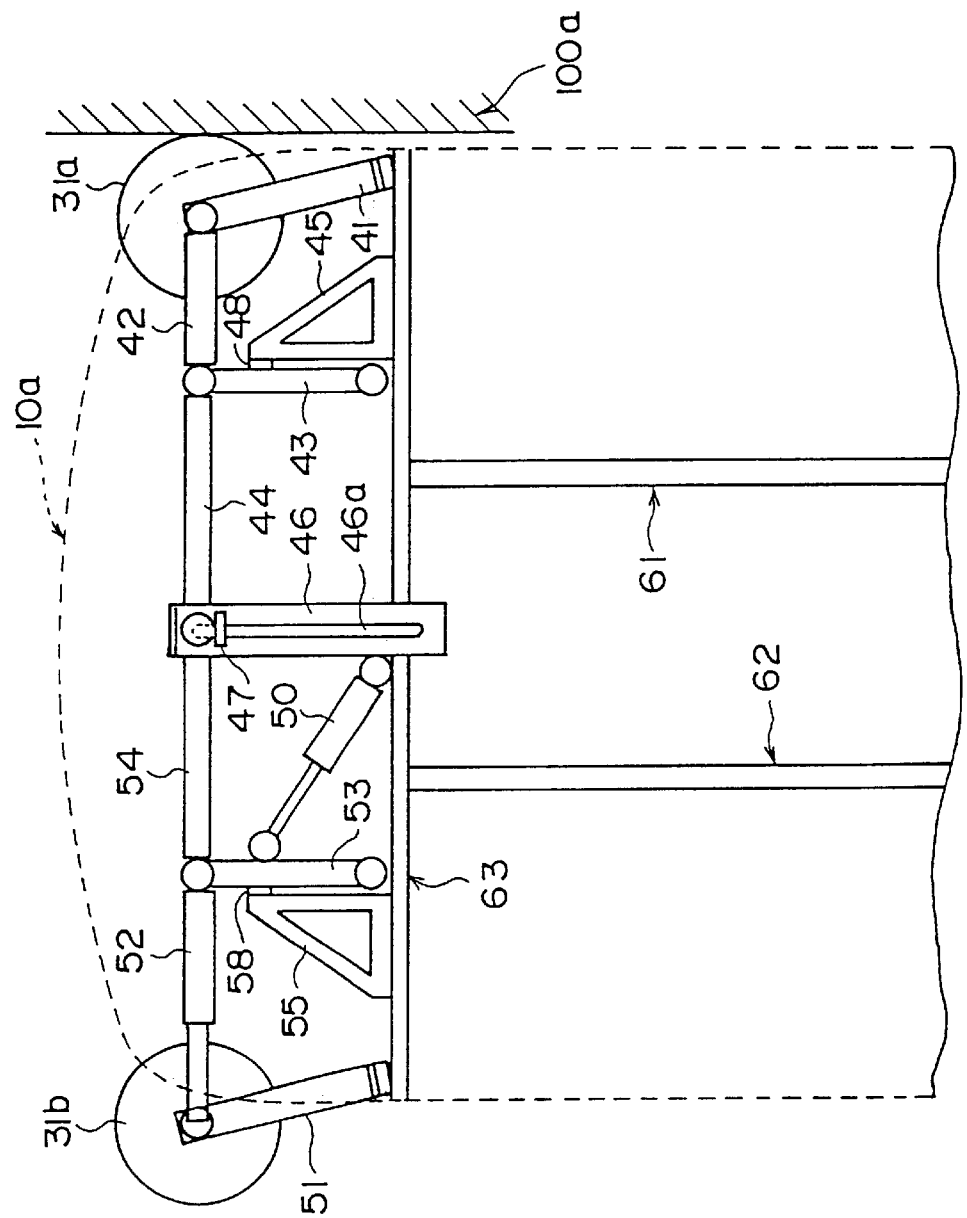
FIG. 4 is a diagram showing an example of a support structure of guide wheels in the contact vehicle guiding system.
Figure 5:
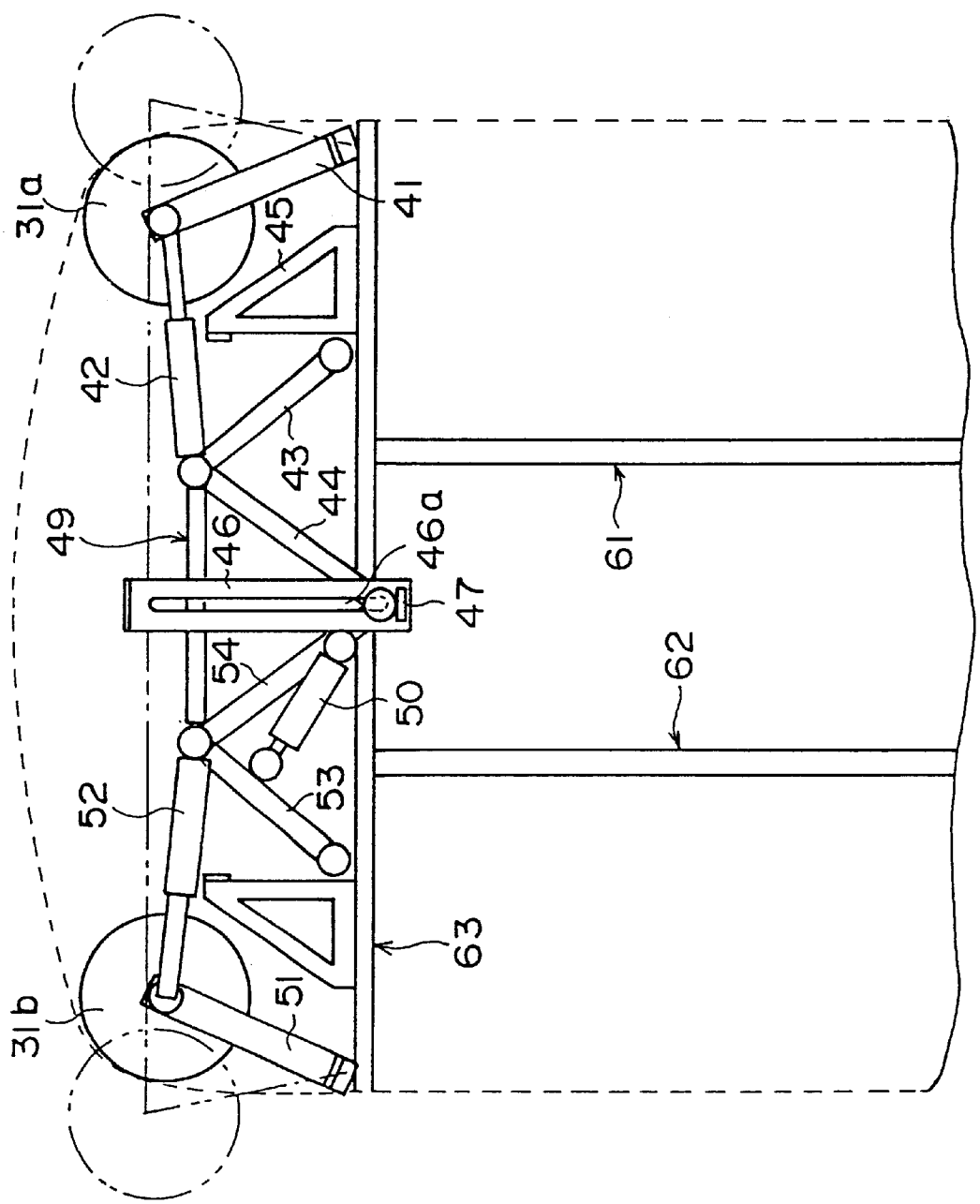
FIG. 5 is a diagram showing a state of the support structure in which the guide wheel is housed in a vehicle body.

The road R shown in FIG. 2 is an exclusive road for the vehicle 10. In order to enable the vehicle 10 which runs on such an exclusive road to run on general roads, the guide wheels 31a, 31b, 32a, 32b must be housed in a vehicle body of the vehicle 10. FIGS. 4 and 5 show a support structure which includes a mechanism for housing the front wheels 31a, 31b in the vehicle body.

As shown in FIG. 4, a lateral frame 63 which extends in a lateral direction of a vehicle body 10a is fixed to a front end part of longitudinal frames 61, 62 which extend in a longitudinal direction of the vehicle body 10a. One end of a support bar 41 is pivotably supported at an end of the lateral frame 63. The front guide wheel 31a is rotatably supported at the other end of the support bar 41. An end of a piston of a guide-wheel damper (an air cylinder) 42 is pivotably connected to the end of the support bar 41 which supports the front guide wheel 31. An end of a link bar 43 is pivotably connected to the lateral frame 63, and the other end of the link bar 43 is pivotably connected to an end of a cylinder of the guide-wheel damper 42. Lengths of the support bar 41 and the link bar 43 connected to both ends of the guide-wheel damper 42 are set so that the guide-wheel damper 42 is positioned substantially in parallel with a lateral direction of the vehicle body 10a. Thus, the guide-wheel damper 42 can effectively damp a lateral force which is exerted thereon via the guide wheel 31a.

The end of the link bar 43 connecting to the guide-wheel damper 42 is pivotably connected to one end of a link bar 44. Additionally, a stopper 45 is fixed to the lateral frame 63 so that the stopper 45 abuts on a side face of the link bar 43 facing outside of the vehicle body 10a via a cushion member 48.

A support bar 51, a guide-wheel damper 52, link bars 53, 54 and a stopper 55 are provided inside a front-left part of the vehicle body 10a in a symmetrical manner to the support bar 41, the guide-wheel damper 42, the link bars 43, 44 and the stopper 45 provided inside a front-right part of the vehicle body 10a. The front guide wheel 31b is rotatably supported at an end of the support bar 51. The guide-wheel damper 52 can effectively damp a lateral force which is exerted thereon via the front guide wheel 31b in the same manner as the guide wheel-damper 42. Similar to a case of the stopper 45 and the link bar 43, a cushion member 58 is interposed between the stopper 55 and the link bar 53.

The link bar 44 on the right side and the link bar 54 on the left side are pivotably connected to each other so that the link bars 44, 54 are substantially directed in a lateral direction of the vehicle body 10a. A movement of the connecting part between the link bars 44, 54 is restricted by a guide plate 46. The guide plate 46 is fixed to the lateral frame 63 and extends substantially in a longitudinal direction of the vehicle body 10a. The guide plate 46 is formed with a slit 46a. The connecting part between the link bars 44, 54 is guided in the slit 46a so that the connecting part can move in a longitudinal direction of the vehicle body 10a. The guide plate 46 is provided with a lock mechanism 47 which can lock (fix) the connecting part between the link bars 44, 54 at either end of the slit 46a.

A guide-wheel housing actuator (air cylinder) 50 is provided between the lateral frame 63 and the link bar 53. Specifically, an end of a cylinder of the guide-wheel housing actuator 50 is pivotably connected to the lateral frame 63 and an end of a piston of the guide-wheel housing actuator 50 is pivotably connected to the link bar 53. Thus, the link bar 53 swings around a supporting point on the lateral frame 53 when the piston of the guide-wheel housing actuator 50 axially moves.

According to the above-mentioned support structure of the front guide wheels 31a, 31b, when the vehicle 10 moves closer to the guide wall 100a until the front guide wheel 31a comes into contact with the guide wall 100a, the front guide wheel 31a moves toward the inside of the vehicle body 10a due to a contraction of the guide-wheel damper 42 caused by a lateral force exerted thereon from the guide wall 100a via the front guide wheel 31a. In this case, the lateral force exerted on the guide-wheel damper 42 is received by the stopper 55 via the link bars 44, 54, 53 and the cushion member 58. Similarly, when the front guide wheel 31b comes into contact with the guide wall 100b, the front guide wheel 31b moves toward inside of the vehicle body 10 due to a contraction of the guide-wheel damper 52 caused by a lateral force exerted thereon from the guide wall 100b via the front guide wheel 31b, and this lateral force is received by the stopper 45 via the link bars 54, 44, 43 and the cushion member 48.

Additionally, when both the front guide wheels 31a, 31b are housed into the vehicle body 10a, the guide-wheel housing actuator 50 is actuated after the lock mechanism 47 of the guide plate 46 is unlocked. In this case, the link bar 53 swings toward the inside of the vehicle body 10a around a supporting point on the lateral frame 63 since the piston of the guide-wheel housing actuator 50 is retracted into the cylinder, pulling the link bar 53. In association with such a movement of the link bar 53, the connecting point between the link bars 54, 44 moves along the slit 46a of the guide plate 46 toward the lateral frame 63. In this case, the guide-wheel damper 52 moves toward the inside of the vehicle body 10a following the movement of the link bar 53. As a result, the support bar 51 swings toward the inside of the vehicle body 10a around the supporting point on the lateral frame 63 so that the front guide wheel 31b is housed into the vehicle body 10a.

The link bar 44 moves in a manner similar to the link bar 54 in association with the movement of the connecting part between the link bars 54, 44 along the guide plate 46. The guide-wheel damper 42 moves toward the inside of the vehicle body 10a following the movement of the link bar 44. Thus, the support bar 41 swings toward inside of the vehicle body 10a around the supporting point on the lateral frame 63 so that the front guide wheel 31a is housed in the vehicle body 10a.

FIG. 5 shows a state of the support structure of FIG. 4 in which the front guide wheels 31a, 31b are housed in a front part of the vehicle body 10a as mentioned above. In this state, a damper 49, which was under the link bars 44, 54 and not shown in FIG. 4, is compressed between a connecting part of the guide-wheel damper 52 and the link bars 53, 54 and a connecting part of the guide-wheel damper 42 and the link bars 43, 44. By locking the lock mechanism 47 in such a state so that a movement of the connecting part between the link bars 54, 44 is prohibited, the state shown in FIG. 5 in which the front guide wheels 31a, 31b are housed in the vehicle body 10a can be maintained.

When the lock mechanism 47 is unlocked and the guide-wheel housing actuator 50 is actuated so that the piston thereof advances, the link bar 53 swings away from the lateral frame 63 around the supporting point on the lateral frame 63. In association with such a movement of the link bar 53, the damper 49 extends and the connecting part between the link bars 44, 54 moves away from the lateral frame 63 along the slit 46a of the guide plate 46. Thus, the link bar 43 swings away from the lateral frame 63 around the supporting point on the lateral frame 63. As a result, the guide-wheel dampers 52, 42 are pushed outwardly so that the respective support bars 51, 41 swing toward the outside of the vehicle body 10a around the respective supporting points, and thus the respective front guide wheels 31a, 31b are pushed out from the vehicle body 10a.

It should be noted that a support structure of the rear guide wheels 32a, 32b (shown in FIG. 3) has substantially the same construction as shown in FIGS. 4 and 5.

Figure 6:
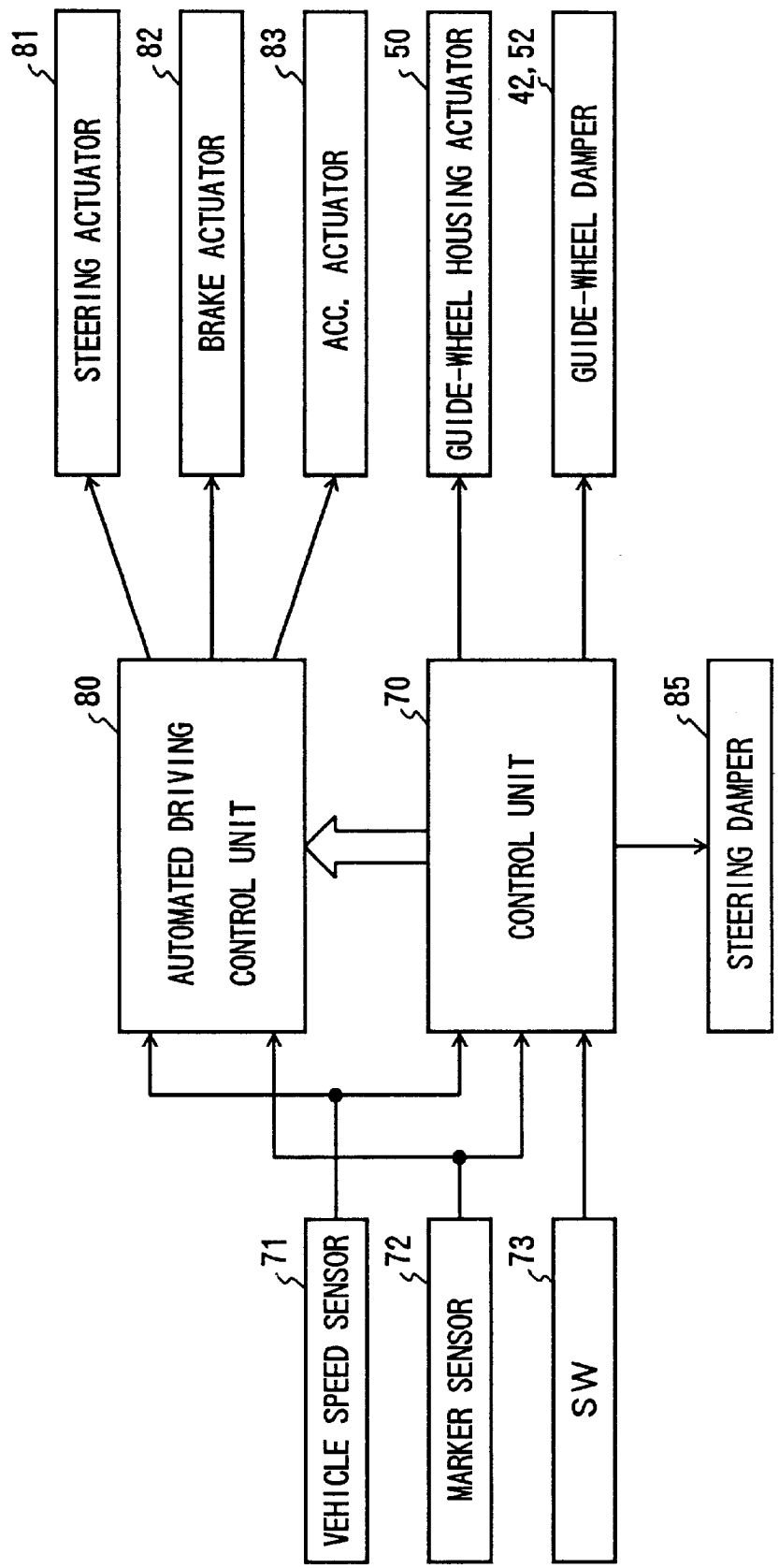
FIG. 6 is a block diagram showing an example of a control system of a noncontact vehicle guiding system.

FIG. 6 shows an example of a control system provided in the vehicle 10. In FIG. 6, a vehicle speed sensor 71 outputs a pulse signal in accordance with a vehicle speed, and a marker sensor 72 outputs a signal in accordance with a magnetic field generated by the magnetic markers provided on the road R. The output signals of the vehicle speed sensor 71 and the marker sensor 72 are supplied to each of a control unit 70 and an automated driving control unit 80. Additionally, an operating signal from a switch 73 is supplied to the control unit 70. The switch 73 is operated by an operator for retracting and extracting the front guide wheels 31a, 31b and the rear guide wheels 32a, 32b.

The automated driving control unit 80 controls a steering actuator 81, a brake actuator 82 and an accelerator actuator 83 based on the output signals of the vehicle speed sensor 71 and the marker sensor 72 so that the vehicle 10 runs along a path defined on the road R (see FIG. 2) in accordance with a predetermined velocity pattern. The steering actuator 81 (a motor, for example) constitutes a part of a steering mechanism of the front wheels 11a, 11b (steered wheels) and is connected to the front wheels 11a, 11b via, for example, a clutch mechanism 84 as shown FIG. 3.

The brake actuator 82 (a solenoid valve, for example) controls a fluid pressure which is supplied to wheel cylinders provided to the front wheels 11a, 11b and the rear wheels 12a, 12b, respectively. Additionally, the accelerator actuator 83 (a motor, for example) controls an opening of a throttle valve.

The control unit 70 controls switching of damper orifices inside the guide-wheel dampers 42, 52 and a steering damper 85 based on the output signals of the vehicle speed sensor 71 and the marker sensor 72. Additionally, the control unit 70 controls actuation of the guide-wheel housing actuator 50 based on the operating signal supplied from the switch 73. Further, the control unit 70 supplies the automated driving control unit 80 with instructions to invalidate and validate a steering control (hereinafter referred to as a steering-free instruction and a steering-free canceling instruction, respectively).

Figure 7:
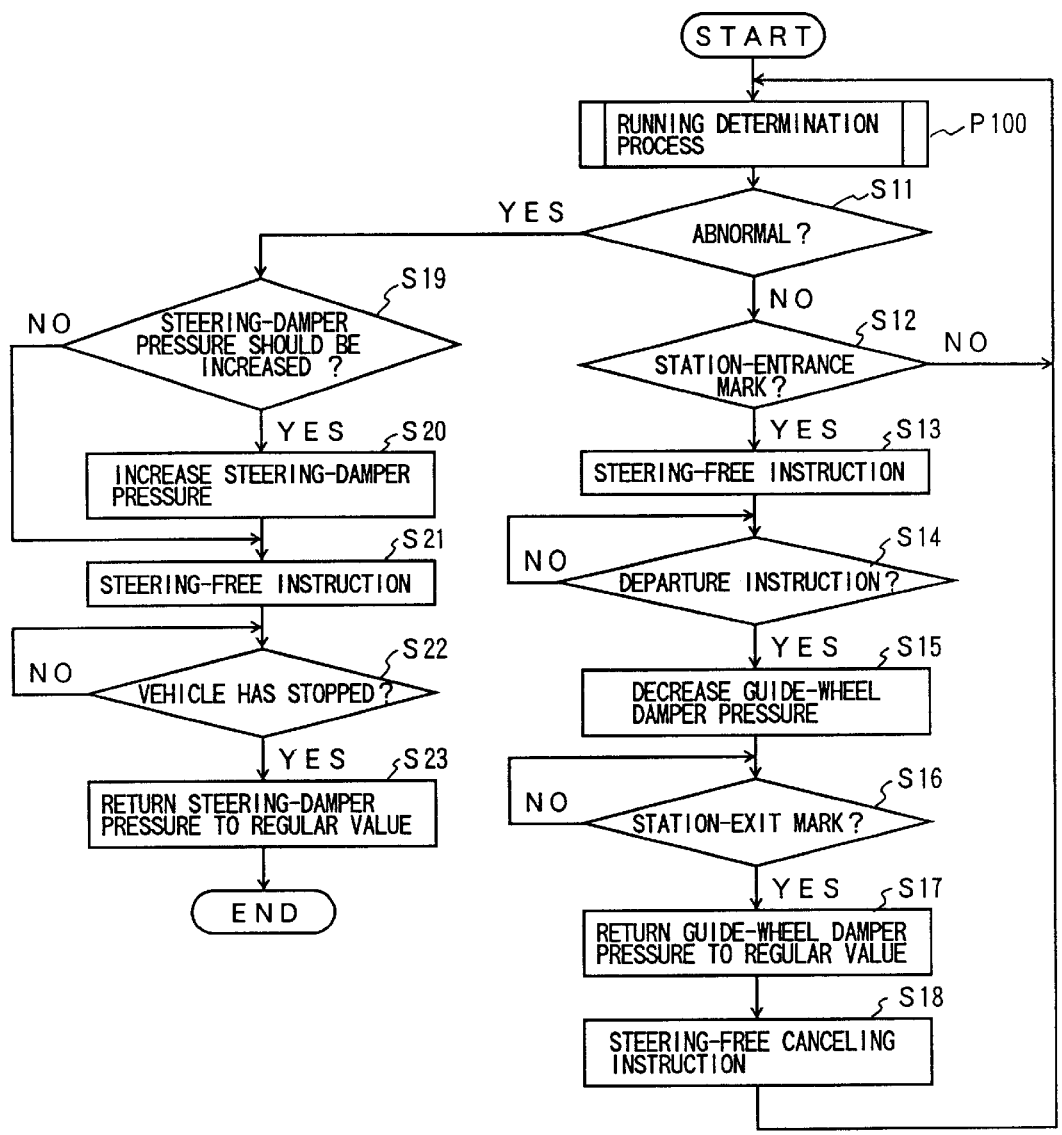
FIG. 7 is a flowchart of a process performed by a control unit shown in FIG. 6.
Figure 8:
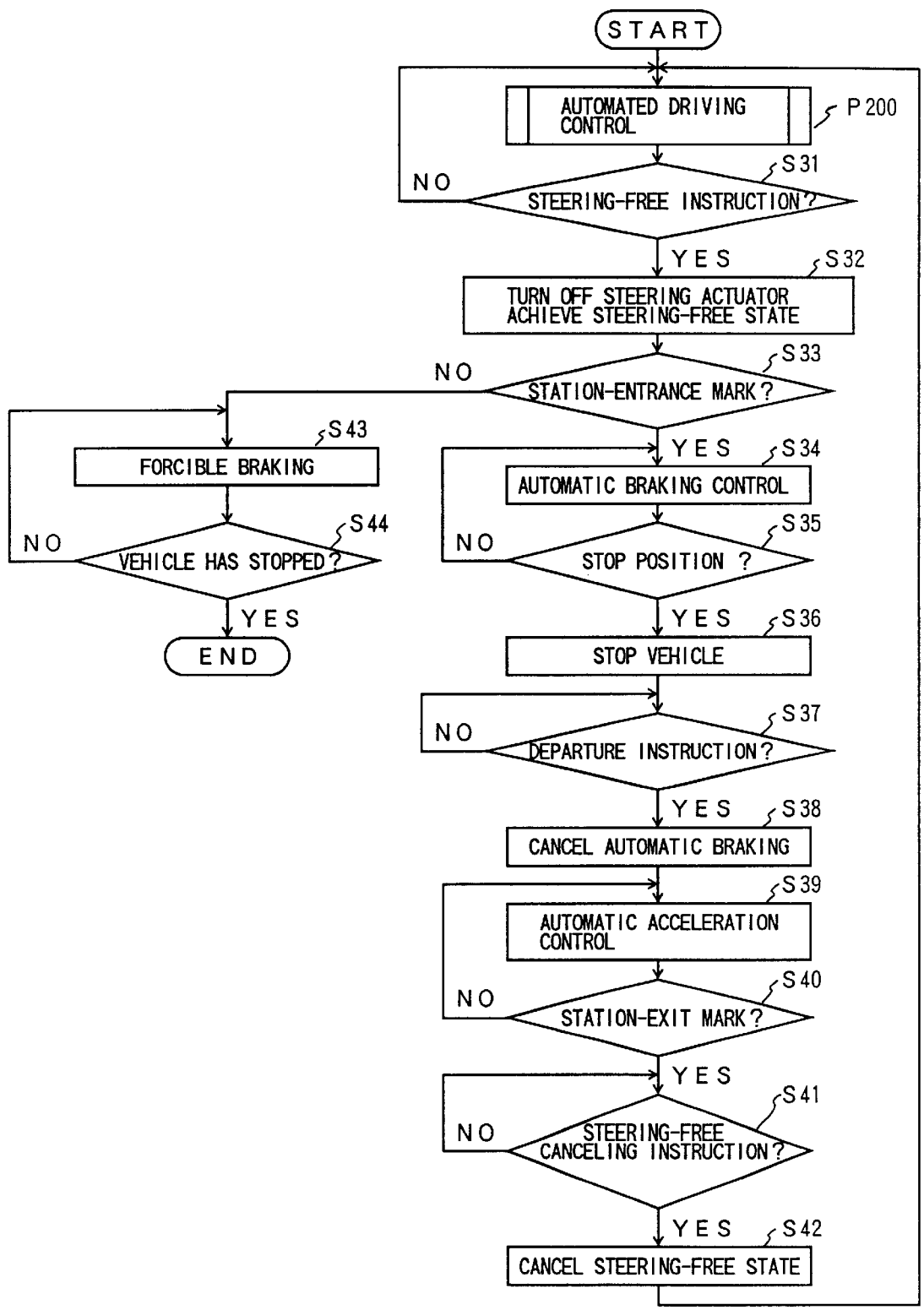
FIG. 8 is a flowchart of a process performed by an automated driving control unit shown in FIG. 6.

When the vehicle 10 runs on the road R in a state where the front guide wheels 31a, 31b and the rear guide wheels 32a, 32b are extracted from the vehicle body 10a (see FIGS. 3 and 4), the control unit 70 and the automated driving control unit 80 perform processes in accordance with, for example, flowcharts shown in FIGS. 7 and 8, respectively.

In FIG. 7, the control unit 70 calculates a lateral position of the vehicle 10 on the road R based on the output signal of the marker sensor 72 (a running determination process: P100). Then, it is determined whether or not the calculated lateral position on the road R is abnormal based on, for example, whether or not the vehicle 10 has deviated from the predetermined path to such an extent that the guide wheels 31a, 32a or 31b, 32b are in contact with the guide wall 100a or 100b (S11). If the lateral position is not abnormal, then it is determined whether or not the magnetic marker (the station entrance marker) provided on the entrance part R2 of the road R at a predetermined distance before the stop part R3 is detected (S12). While the vehicle 10 is normally running on the general road part R1, the running determination process P100 and the processes of steps S11, S12 are repeatedly performed.

In this case, as shown in FIG. 8, the automated driving control unit 80 repeatedly performs an automated driving control (P200) in which the steering actuator 81, the brake actuator 82 and the accelerator actuator 83 are controlled in accordance with the output signals of the vehicle speed sensor 71 and the marker sensor 72, while determining whether or not the steering-free instruction is supplied from the control unit 70 in step S31 (an automated driving mode).

If the vehicle 10 enters the entrance part R2 and the station entrance mark is detected (YES in S12 of FIG. 7) while the vehicle 10 is running on the general road part R1 in the automated driving mode, as mentioned above, the control unit 70 supplies the steering-free instruction to the automated driving control unit 80 (S13). Thereafter, the control unit 70 repeatedly determines whether or not an instruction to start the vehicle 10 (a departure instruction) is generated (S14).

In such a state, if the automated driving control unit 80 determines that the steering-free instruction is supplied from the control unit 70 (YES in S31 of FIG. 8), the automated driving control unit 80 turns off the steering actuator 81 and performs a steering-free control (S32). Specifically, in the steering-free control, the automated driving control unit 80 operates the clutch mechanism 84 connecting the steering actuator 81 and the steered wheels (front wheels 11a, 11b) so that the steered wheels are released from constraint by the steering mechanism. Then, the automated driving control unit 80 determines whether or not the station entrance mark is detected (S33). Since the station entrance mark has been detected before the steering free instruction is supplied (see S12, S13 in FIG. 7), it is affirmatively determined in S33. Thus, the automated driving control unit 80 performs an automatic braking control (S34) so that the vehicle 10 is decelerated in accordance with a predetermined velocity pattern corresponding to a case of stopping until the stop mark provided in the stop part R3 is detected. When the stop mark is detected, the brake actuator 82 is controlled to generate a maximum braking force so as to positively stop the vehicle 10 (S36). As a result, the vehicle 10 stops at the station provided in the stop part R3. Thereafter, the automated driving control unit 80 repeatedly determines whether or not the departure instruction is generated (S37).

According to the above-mentioned processes performed by the control unit 70 and the automated driving control unit 80, the steered wheels (front wheels 11a, 11b) are released from constraint by the steering mechanism including the steering actuator 81 when the vehicle 10 reaches a position at the predetermined distance before the stop part R3. This timing at which the steered wheels are released from constraint by the steering mechanism corresponds to a timing immediately before the front guide wheels 31a, 31b come into contact with the guide walls 100a, 100b, a space of which gradually decreases. When at least one of the front guide wheels 31a, 31b comes into contact with the corresponding guide walls 100a or 100b in a state where the steered wheels can be freely steered (hereinafter, this state is referred to as a steering-free state), the steered wheels are directed in a straight (neutral) direction of the vehicle 10 by a lateral force exerted on the vehicle 10 from the guide wall 100a or 100b via the front guide wheel 31a or 31b. Further, when both the front guide walls 31a, 31b are in contact with the guide wheels 100a, 100b, respectively, a lateral position of the vehicle 10 is restricted to a substantially central position of the road R.

When the vehicle 10 continues to run in such a state, lateral forces exerted on the front guide wheels 31a, 31b gradually increase in association with a decrease in a space between the guide walls 100a, 100b. Thus, the front guide wheels 31a, 31b are moved toward the inside of the vehicle body 10a in association with contraction of the guide-wheel dampers 42, 52 which support the front guide wheels 31a, 31b. In this case, forces which restrict a lateral position of the vehicle 10 from both sides thereof gradually increase due to an increase in reaction forces generated by the guide-wheels dampers 42, 52. After both the front guide wheels 31a, 31b have come into contact with the guide walls 100a, 100b, the rear guide wheels 32a, 32b come into contact with the guide walls 100a, 100b, and thereafter, the vehicle 10 reaches the stop part R3 where a space between the guide walls 100a, 100b is the minimum value W2. In this stop part R3, since the lateral forces exerted on the vehicle 10 become maximum, a lateral position of the vehicle 10 can be positively restricted to a substantially central position of the road R. The vehicle 10 stops at the station in such a state.

When the control unit 70 detects the departure instruction after the vehicle 10 has stopped at the station of the stop part R3 and passengers have finished getting on and off the vehicle 10 (YES in S14 of FIG. 7), the control unit 70 decreases damping pressures of the guide-wheel dampers 42, 52 (S15). Thus, the lateral forces exerted on the vehicle 10 which restrict a lateral position of the vehicle 10 is decreased. Thereafter, the control unit 70 repeatedly determines whether or not the station exit mark is detected (S16). The departure instruction may be generated by another control system in the vehicle 10 which can monitor passengers getting on and off the vehicle 10 or by a monitor system provided on the station.

On the other hand, when the automated driving control unit 80 detects the departure instruction generated as mentioned above (YES in S37 of FIG. 8), the automated driving control unit 80 operates the brake actuator 82 so as to cancel the generation of the maximum braking force by the automatic braking control (S38). Then, the automated driving control unit 80 operates the accelerator actuator so as to perform an automatic acceleration control in accordance with a predetermined acceleration control pattern corresponding to a case of starting the vehicle 10 (S39).

Since the automatic acceleration control is performed in a state where the lateral forces which restrict a lateral position of the vehicle 10 are decreased as mentioned above, the vehicle 10 can smoothly depart from the station.

When the control unit 70 detects the station exit mark while the vehicle 10 is running in the stop part R3 (YES in S16 of FIG. 7), the control unit 70 returns the damping pressures of the guide-wheel dampers 42, 52 to a regular value (S17) and supplies the steering-free canceling instruction to the automated driving control unit (S18). Thereafter, the control unit 70 repeatedly performs the running determination process (P100), the process of determining abnormality of a lateral position of the vehicle 10 (S11) and the process of determining a detection of the station entrance mark (S12), as mentioned above.

On the other hand, if the automated driving control unit 80 determines a detection of the station exit mark (YES in S40 of FIG. 8), the automated driving control unit 80 further determines whether or not the steering-free canceling instruction is supplied from the control unit 70 (S41). When the steering-free canceling instruction is supplied from the control unit 70 as mentioned above (YES in S41), the steering actuator 81 is turned on and the actuation of the clutch mechanism 84 connecting the steering actuator 81 and the steered wheels is stopped so as to cancel the steering-free state (S42). Thereafter, the automated driving control unit 80 controls the steering actuator 81, the brake actuator 82 and the accelerator actuator 83 based on the output signals of the vehicle speed sensor 71 and the marker sensor 72 so that the vehicle 10 runs on the predetermined path with the predetermined velocity pattern (the automated driving mode: P200), while determining whether or not the steering-free instruction is supplied from the control unit 70.

As mentioned above, in a regular situation, when the vehicle 10 is running in the general road part R1, the vehicle 10 is controlled to run along the predetermined path in the automated driving mode. On the other hand, when the vehicle 10 moves from the entrance part R2 to the stop part R3 or from the stop part R3 to the general road part R1, the vehicle 10 is steered by restricting a lateral position thereof with the front guide wheels 31a, 31b and the rear guide wheels 32a, 32b being constrained between the guide walls 100a, 100b in a state where the steered wheels (front wheels 11a, 11b) can be freely steered, instead of by controlling the vehicle 10 in the automated driving mode.

In the above-mentioned processes of the driving control, if a lateral position of the vehicle 10 has deviated from the predetermined path until the guide wheels 31a, 32a or 31b, 32b come into contact with the corresponding guide wall 100a or 100b due to a burst of a tire, a slip, or a failure of a sensor of the vehicle 10 while the vehicle 10 is running in the general road part R1, the control unit 70 determines an abnormality of a lateral position of the vehicle 10 based on the output signal of the marker sensor 72 (YES in S11 of FIG. 7). When it is determined that the lateral position of the vehicle 10 is abnormal in this way, the control unit 70 further determines whether or not it is necessary to increase a damping pressure of the steering damper 85 (S19). A description regarding the necessity of increasing the damping pressure of the steering damper 85 will be given later.

If it is determined that the damping pressure of the steering damper 85 need not be increased, the control unit 70 supplies the steering-free instruction to the automated driving control unit 80 (S21). Thereafter, the control unit 70 repeatedly determines whether or not the vehicle 10 has stopped (S22).

On the other hand, when the automated driving control unit 80 receives the steering-free instruction from the control unit 70 (YES in S31 of FIG. 8), the automated driving control unit 80 turns off the steering actuator 81 and actuates the clutch mechanism 84 which connects the steering actuator 81 and the steered wheels (front wheels 11a, 11b) (S32). Thus, the steered wheels are released from constraint by the steering mechanism. In this case, since the vehicle 10 is running in the general road part R1, the station entrance mark is not detected (NO in S33). Thus, the automated driving control unit 80 operates the brake actuator 82 so as to perform a forcible braking control which forcibly generates a braking force (S43) while determining whether or not the vehicle 10 has stopped (S44).

According to the above-mentioned processes performed by the control unit 70 and the automated driving control unit 80, the guide wheels 31a, 32a (or 31b, 32b) come into contact with the guide wall 100a (or 100b ) in the steering-free state. Thus, a lateral position of the vehicle 10 is restricted by the guide wall 100a (or 100b). In this case, a lateral force is exerted on the vehicle 10 from the guide wall 100a (or 100b) via the guide wheels 31a, 32a (or 31b, 32b) supported by the guide-wheel damper 42 (or 52). When the lateral force exerted on the vehicle 10 exceeds a restoring force of the steered wheels (front wheels 11a, 11b), the steered wheels are naturally steered in a neutral (straight) direction (indirect steering). As a result, the vehicle 10 is decelerated to be stopped by the forcible braking control with the guide wheels moving along the guide wall.

When the steered wheels are indirectly steered by a lateral force exerted on the vehicle 10, as mentioned above, it may be desirable to adjust a damping force of the steering damper 85 which governs the restoring force of the steered wheels, in view of improving a stability of the vehicle 10. That is, the determination of a necessity of increasing the damping pressure of the steering damper 85 in step S19 is performed in the following manner.

First, a curvature of the road R on which the vehicle 10 is running is calculated based on detected vehicle speed and lateral acceleration (a lateral-acceleration sensor is not shown in the figures). If the calculated curvature is larger than or equal to a predetermined value (that is, if the road R curves sharply), it is determined whether or not the detected vehicle speed is larger than or equal to a reference vehicle speed predetermined in accordance with a curvature of the road. If the detected vehicle speed is larger than or equal to the reference vehicle speed, it is determined that the damping force of the steering damper 85 should be increased. That is, as a curvature of the road becomes larger and as a vehicle speed becomes higher, the damping force of the steering damper 85 should be increased because the steered wheels should be more slowly returned to be in the neutral direction.

The above-mentioned predetermined value for the curvature of the road and the reference vehicle speed are, for example, experimentally determined as values with which the vehicle 10 can stably run in a state where the steered wheels can be freely steered.

If it is determined that the damping pressure of the steering damper 85 should be increased in the above-mentioned manner (YES in S19), the control unit 70 operates an electromagnetic actuator for switching a diameter of the damper orifice inside the steering damper 85 so that the orifice diameter is switched to a smaller value. As a result, the damping pressure of the steering damper 85 is increased (S20).

When the vehicle 10 has been stopped by the forcible braking control performed by the automated driving control unit 80, the control unit 70 determines that the vehicle 10 has stopped (YES in S22 of FIG. 7). In this case, the control unit 70 returns the damping pressure of the steering damper 85 to the regular value by operating the above-mentioned electromagnetic actuator (S23). On the other hand, if the automated driving control unit 80 determines that the vehicle 10 has stopped (YES in S44 of FIG. 38), the processes shown in FIG. 8 are finished.

As mentioned above, when the vehicle 10 has deviated from the path due to a burst of a tire, a slip or a failure of a sensor, the steered wheels (front wheels 11*a*, 11*b*) are set in the steering-free state since the automated driving mode should not be maintained. In this case, since the vehicle 10 runs with the guide wheels 31*a*, 32*a* (or 31*b*, 32*b*) being in contact with the corresponding guide wall 100*a* (or 100*b*), the steered wheels are naturally steered to be in the neutral direction by a lateral force exerted on the vehicle 10 from the guide wall via the guide wheels (indirect steering). Thus, the vehicle 10 can be stably steered. Additionally, the vehicle 10 can be safely stopped by the forcible braking control.

In the above-mentioned embodiment, descriptions are given for a case where the vehicle 10 has deviated from the path due to a burst of a tire, a slip or a failure of a sensor. However, the above-mentioned control can be applied to a case where the vehicle 10 has deviated from the path due to a strong crosswind, for example.

That is, when the vehicle 10 is steered in the automated driving mode, the vehicle 10 may be moved in a lateral direction until the guide wheels 31*a*, 32*a* (or 31*b*, 32*b*) come into contact with the guide wall 100*a* (or 100*b*) due to a strong crosswind. In this case, a reaction force of the guide-wheel damper 42 (or 52) supporting the guide wheels 31*a*, 32*a* (or 31*b*, 32*b*) is exerted on the vehicle 10 as a force which pushes the vehicle 10 toward the center of the road 10. If the vehicle 10 is returned to the predetermined path by this force, the automated driving mode can be maintained.

On the other hand, if the vehicle is not returned to the predetermined path by the above-mentioned force, the automated driving mode is interrupted and the steered wheels are set in the steering-free state, as a case of the above-mentioned embodiment. Thus, the vehicle 10 is decelerated to be stopped by the forcible braking control with the steered wheels being indirectly steered by the lateral force exerted on the vehicle 10 from the guide wall via the guide wheels.

Considering the above-mentioned case where the vehicle 10 is laterally moved by a crosswind, it may be determined that a lateral position of the vehicle 10 is abnormal in step S11 of FIG. 7 when, for example, a state in which the vehicle 10 has deviated from the path and the guide wheels are in contact with the guide wall is maintained for a predetermined time.

Figure 9:
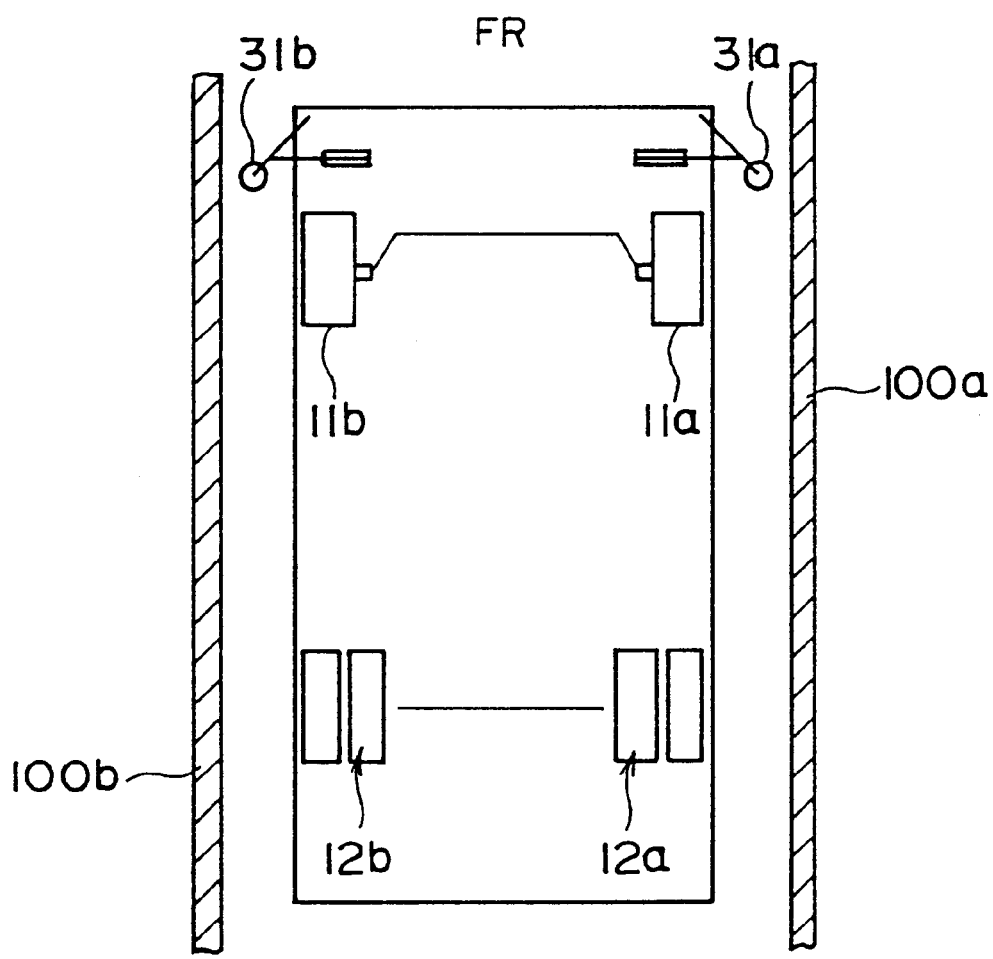
FIG. 9 is a diagram showing another example of a contact vehicle guiding system.

In the above-mentioned embodiment, the front guide wheels 31*a*, 31*b* ahead of the front wheels 11*a*, 11*b* and the rear guide wheels 32*a*, 32*b* behind the rear wheels 12*a*, 12*b* laterally project from the vehicle 10. However, it is also possible to achieve the same function as the above-mentioned embodiment by providing only the front guide wheels 31*a*, 31*b* ahead of the front wheels 11*a*, 11*b*(steered wheels), as shown in FIG. 9.

Figure 10:
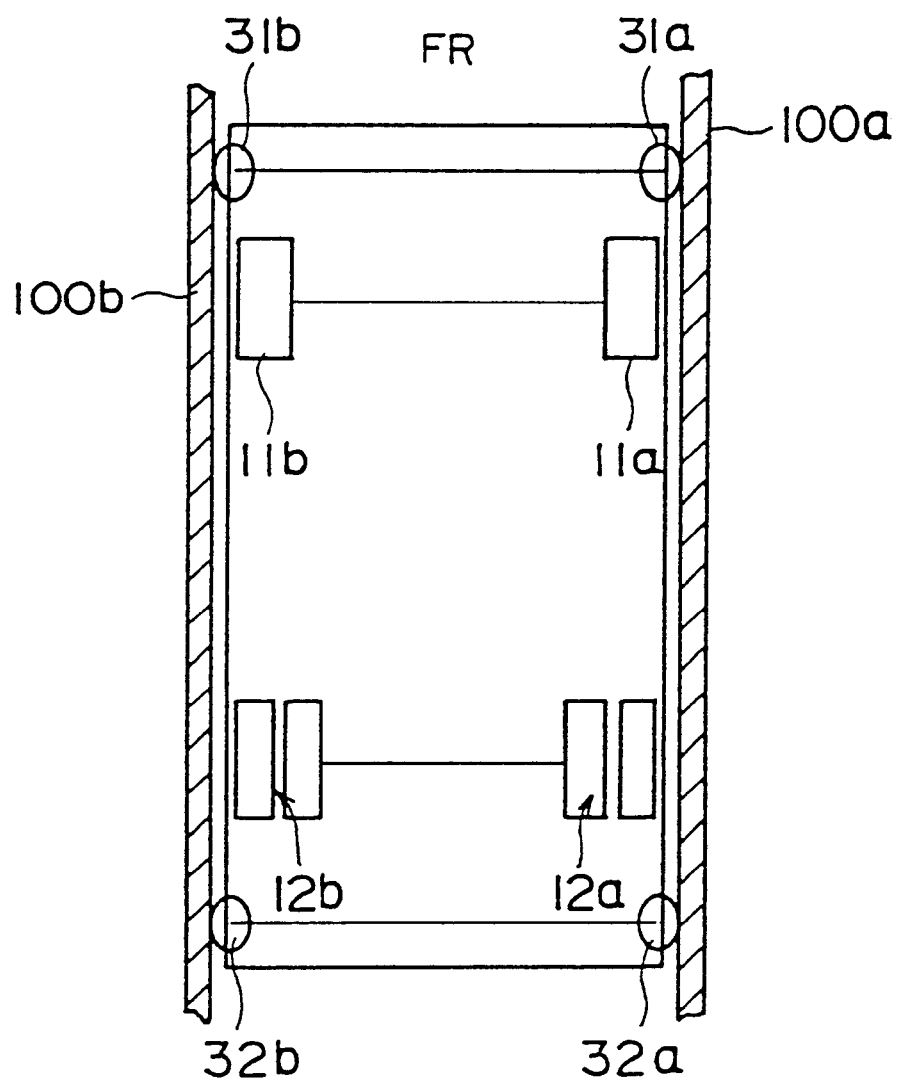
FIG. 10 is a diagram showing a further example of a contact vehicle guiding system.

Additionally, the guide wheels 31*a*, 31*b*, 32*a*, 32*b* may be supported by a laterally rigid frame instead of the guide-wheel dampers 42, 52. In such a structure, the guide wheels 31*a*, 31*b*, 32*a*, 32*b* preferably have a high lateral elasticity by being made of, for example, polyurethane foam rubber. In this case, a space between the guide walls 100*a*, 100*b* may be set to be slightly larger than a width of the vehicle body 10*a*, as shown in FIG. 10, so that a lateral position of the vehicle 10 can be restricted by a resilient force of the guide wheels 31*a*, 31*b*, 32*a*, 32*b* generated in accordance with the lateral elasticity thereof.

Figure 11:
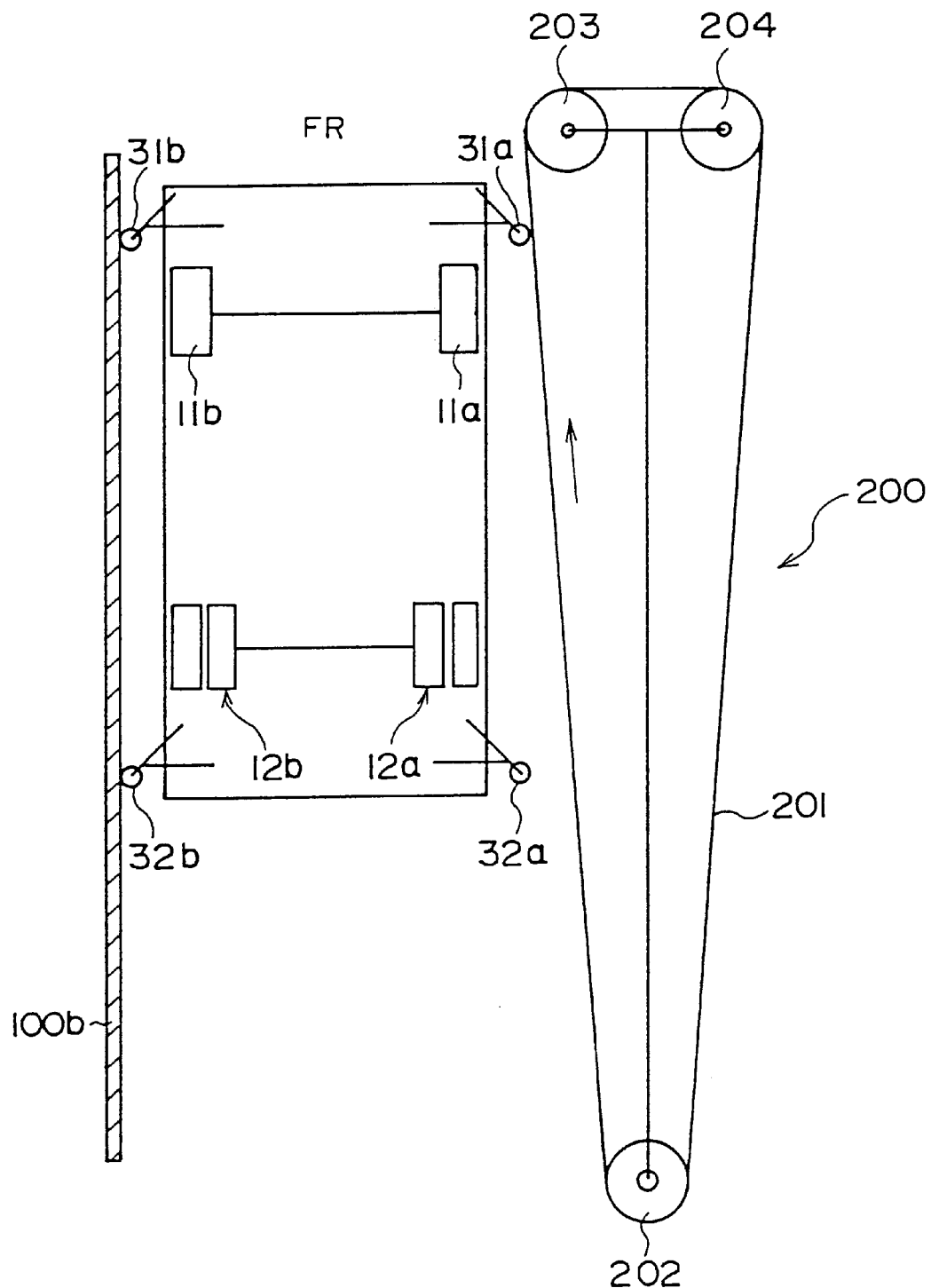
FIG. 11 is a diagram showing a still further example of a contact vehicle guiding system.

Further, one of the guide walls 100*a*, 100*b* in the entrance part R2 may be constructed as a belt which has a shock-absorbing function in the lateral direction, as shown in FIG. 11. In the structure shown in FIG. 11, a shock-absorbing guide wall 200 comprises a driving pulley 202, driven pulleys 203, 204 and a rubber belt 201 which is engaged around the pulleys 202, 203, 204 with a predetermined tension. The driving pulley 202 is rotated so that the belt 201 moves in a direction shown by an arrow in FIG. 11. The shock-absorbing guide wall 200 having such a structure is provided in the entrance part R2 instead of the guide wall 100*a*.

When the vehicle 10 enters the entrance part R2 provided with the shock-absorbing guide wall 200, the steered wheels in the steering-free state are steered by a lateral force exerted on the vehicle 10 each time when the front guide wheel 31*b* and the rear guide wheel 32*b* on the left side come into contact with the guide wall 100*b* or the front guide wheel 31*a* on the right side comes into contact with the belt 201. Thus, a lateral position of the vehicle 10 gradually converges toward a center of the road R. When the front guide wheels 31*a*, 31*b* are constrained between the guide wall 100*b* and the belt 201, the lateral position is substantially restricted to the center of the road R. The vehicle 10 enters the subsequent stop part R3 in such a state.

In this case, vibrations transmitted to the vehicle 10 are reduced by the shock-absorbing function of the belt 201.

The shock-absorbing guide wall 200 comprising the belt 201 may be used as each guide wall in the stop part R3 where the station is provided or as a guide wall on a downwind side of the general road part R1 where a strong crosswind frequently blows. Additionally, the shock-absorbing guide wall 200 may be provided on a junction of the road R where the road R branches into two lanes.

Figure 12A:
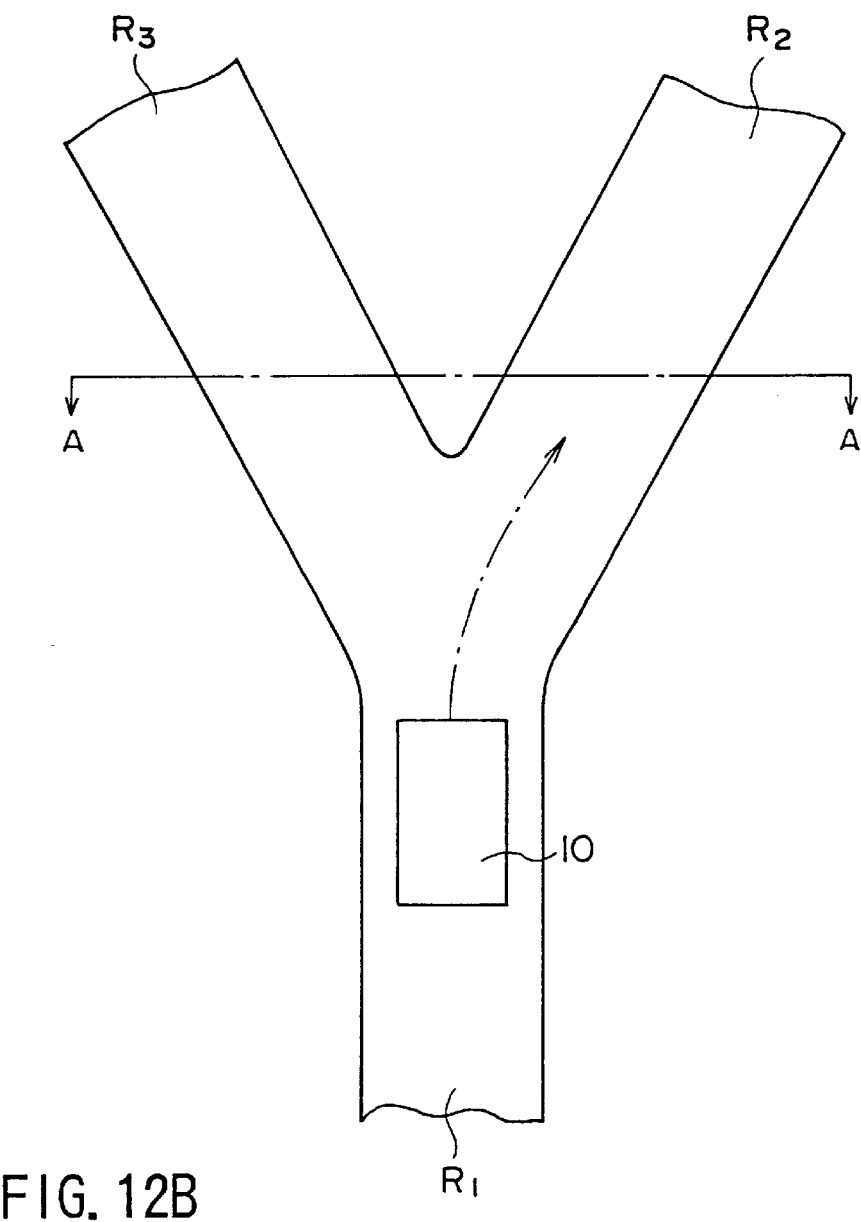
FIGS. 12A and 12B are diagrams showing an example of branch roads in the guideway transit system.
Figure 12B:
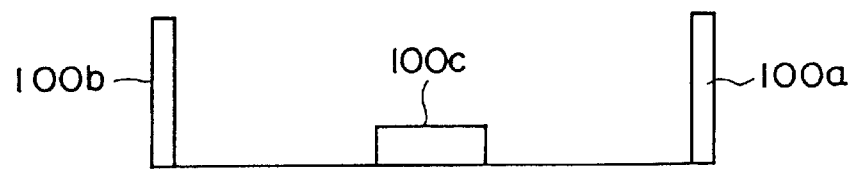

When a road R1 branches into two branch roads R2, R3 as shown in FIG. 12A, for example, a branch wall 100c is provided at a junction of the branch roads R2 and R3, as shown in FIG. 12B. FIG. 12B shows a cross section along a line A—A in FIG. 12A.

As shown in FIGS. 12A and 12B, the guide wall 100a which is provided on a right side of the road R1 extends into the guide wall 100a which is provided on a right side of the branch road R2. Similarly, the guide wall 100b which is provided on a left side of the road R1 extends into the guide wall 100b which is provided on a left side of the branch road R3. In addition, the branch wall 100c is provided at a border between the branch roads R2 and R3. The branch wall 100c has a convex shape projecting into the road R1. Side faces of the branch wall 100c extend along a left side of the branch road R2 and a right side of the branch road R2, respectively. A height of the branch wall 100c is smaller than a height of each of the guide walls 100a, 100b and is designed to be approximately 20 centimeters, for example.

When the vehicle 10 passes through the junction provided with the branch wall 100c, the vehicle 10 runs along one of the branch roads R2, R3 which branch from the road R1 in the automated driving mode. However, a lateral position of the vehicle 10 may be shifted toward the branch wall 100c between the branch roads R2, R3 due to some trouble in driving control of the automated driving mode when the vehicle 10 enters one of the branch roads R2, R3. In this case, the lateral position of the vehicle 10 is restricted by a branch-road guide member 90 provided on the vehicle 10 being in contact with the branch wall 100c.

Figure 13:
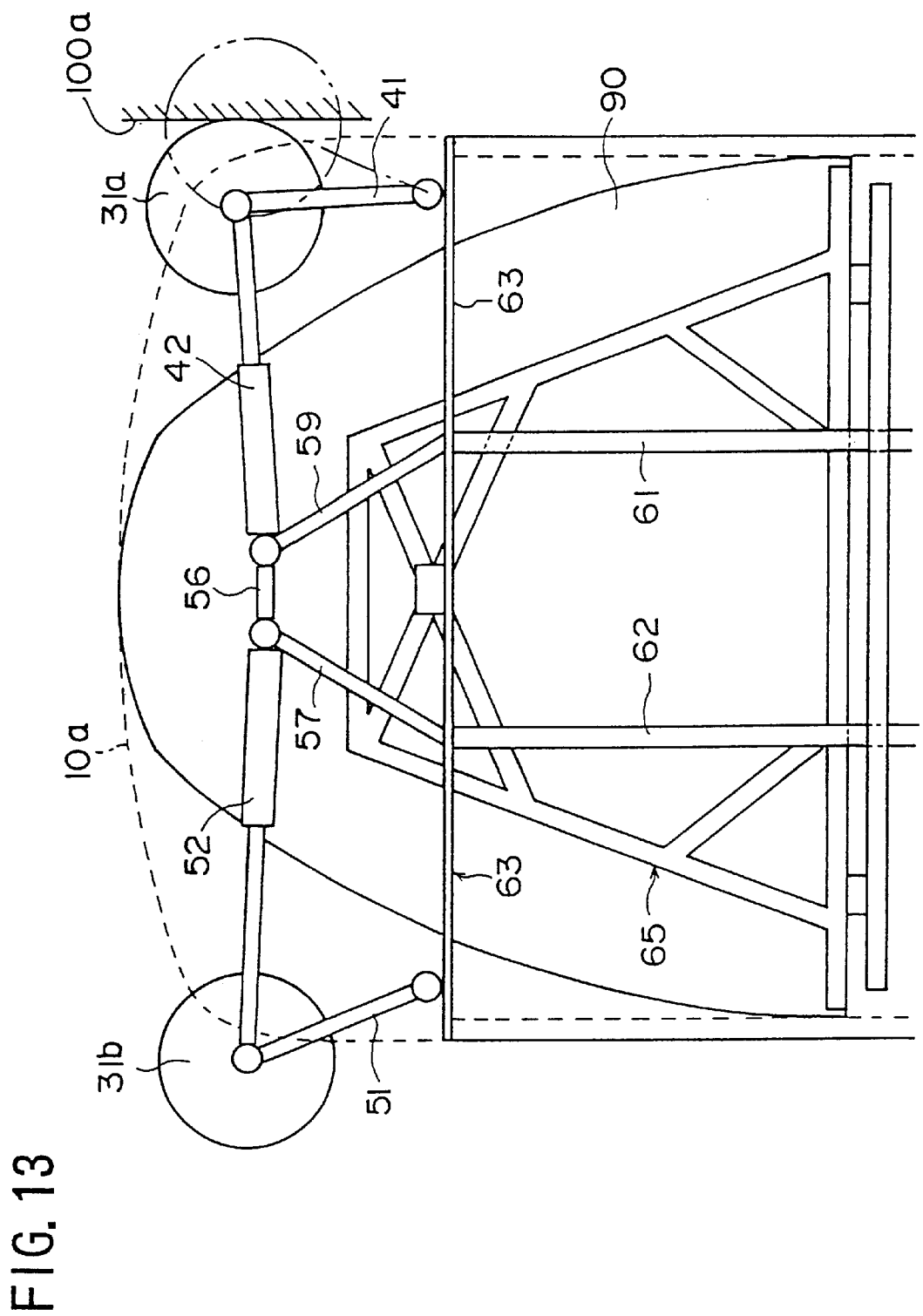
FIG. 13 is a diagram showing another example of a structure of the vehicle in the contact vehicle guiding system.
Figure 14:
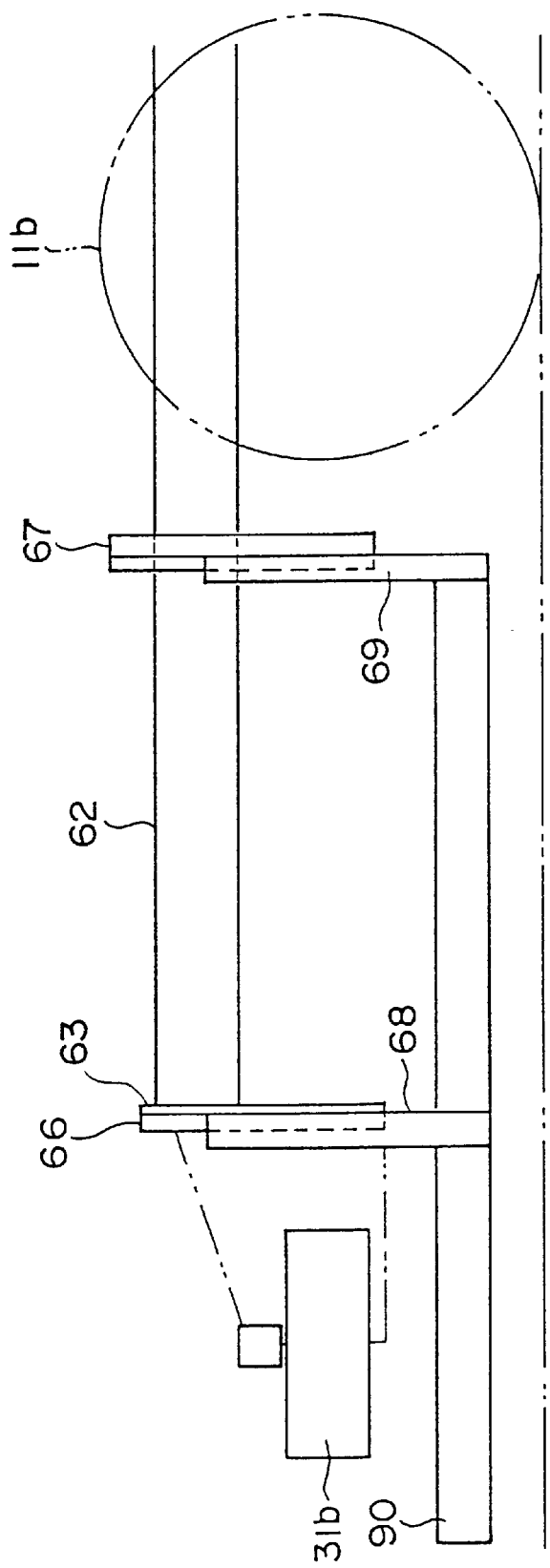
FIG. 14 is a diagram showing a mount structure of a branch-road guide member shown in FIG. 13.

In such a guideway transit system, the branch-road guide member 90 is provided ahead of the front wheels of the vehicle 10, together with the guide wheels 31a, 31b laterally projecting from the vehicle 10, as shown in FIGS. 13 and 14.

As shown in FIG. 13, the longitudinal frames 61, 62 and the lateral frame 63 are connected to each other inside the vehicle body 10a in the same manner as shown in FIGS. 4 and 5. The front guide wheel 31a is rotatably supported at one end of the support bar 41, and the other end of the support bar 41 is pivotably connected to the lateral frame 63 on a right part of the vehicle body 10a. Additionally, the end of the support bar 41 supporting the front guide wheel 31a is connected to an end of the piston of the guide-wheel damper 42. Similarly, the support bar 51 and the guide-wheel damper 52 are provided in a left part inside the vehicle body 10a. Ends of the cylinders of the guide-wheel dampers 42, 52 are supported by the link mechanism constituted by the link bars 56, 57, 59.

According to the above-mentioned structure, when the front guide wheel 31a is pressed against the guide wall 100a, a lateral position of the vehicle 10 is restricted and the guide-wheel damper 42 is compressed so that a reaction force of the guide-wheel damper 42 is exerted on the vehicle body 10a, as in the case of the above-mentioned embodiment shown in FIGS. 4 and 5. Similarly, when the front guide wheel 31b is pressed against the guide wall 100b, a lateral position of the vehicle 10 is restricted and a lateral force is exerted on the vehicle body 10a. Thus, the steered wheel in the steering-free state is steered in the neutral direction by the lateral forces exerted from the guide walls 100a, 100b.

The branch-road guide member 90 is provided below the support mechanism of the front guide wheels 31a, 31b and the frames 61, 62, 63. The branch-road guide member 90 is a U-shaped plate-like member having a convex shape at a front end thereof. A reinforcing frame 65 is fixed to an upper surface of the branch-road guide member 90 via a flange part by means of bolts or adhesive.

FIG. 14 is a side view of the vehicle body 10a seen from the left in FIG. 13. In FIG. 14, a structure for mounting the branch-road guide member 90 is mainly shown and other members are omitted.

As shown in FIG. 14, a plurality of slide bars 66 which extend vertically are provided integrally with the lateral frame 63, and a plurality of slide bars 67 which extends vertically are provided integrally with the longitudinal frames 61, 62. Support bars 68 are slidably mounted on the respective slide bars 66. Similarly, support bars 69 are slidably mounted on the respective slide bars 67. The branch-road guide body 90 is fixed to lower ends of the support bars 68, 69 so as to be in parallel with a road surface.

When the vehicle 10 is used as a vehicle of the guideway transit system shown in FIG. 2, a height of the branch-road guide member 90 is adjusted so that the branch-road guide member 80 can be in contact with the branch wall 100c. On the other hand, when the vehicle 10 runs on a general road, the branch-road guide member 90 is held in a position which is higher than a minimum height of the vehicle 10 by lifting the support bars 68, 69 along the slide bars 66, 67 by means of a lifter mechanism (not shown).

Figure 15:
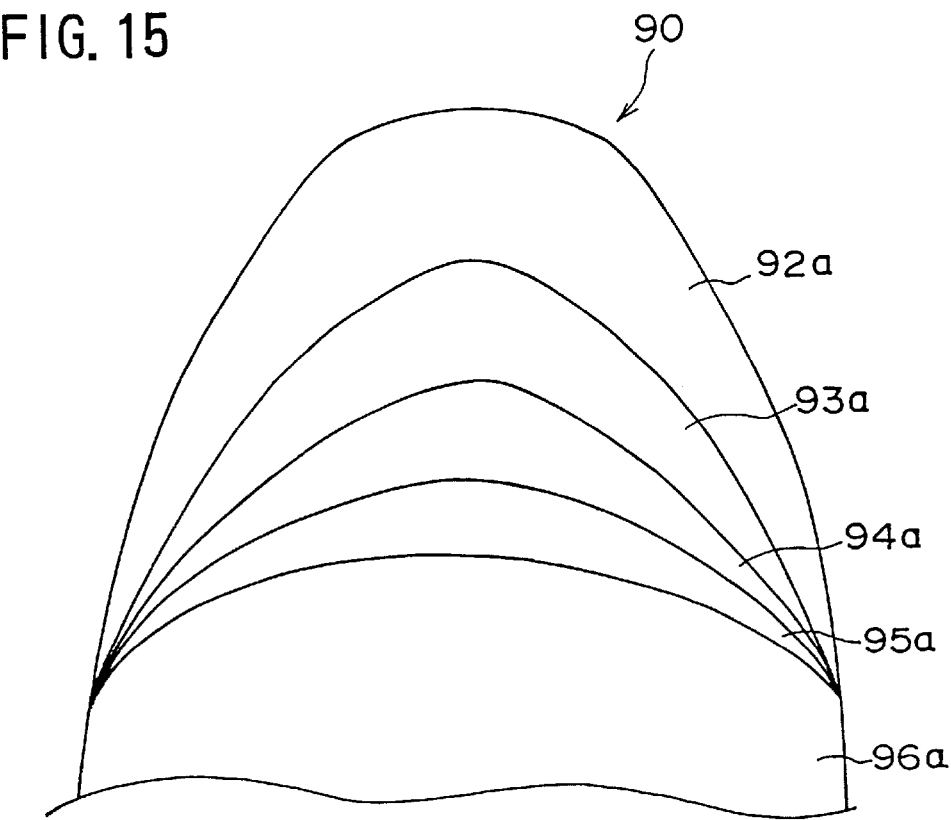
FIG. 15 is a diagram showing a top view of the branch-road member.
Figure 16:
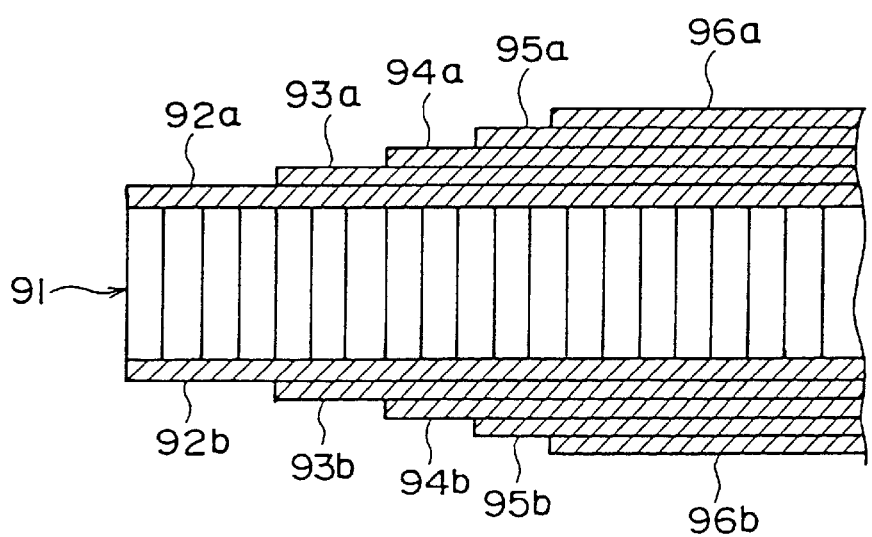
FIG. 16 is a diagram showing a cross section of the branch-road member.

FIGS. 15 and 16 show a detailed structure of the branch-road guide member 90. As seen from FIGS. 15 and 16, thin plates 92a, 93a, 94a, 95a, 96a which are reinforced by carbon fibers are provided on an upper surface of a base plate 91 with ends of the plates 92a to 96a being shifted one after another. Similarly, thin plates 92b, 93b, 94b, 95b, 96b which are reinforced by carbon fibers are provided on a lower surface of the base plate 91 with ends of the plates 92b to 96b being shifted one after another.

The base plate 91 is made of thermosetting resin such as polycarbonate or polypropylene, and has a honeycomb structure which has a relatively low strength under a force acting obliquely from the front, that is, a force acting in a direction of contact with the branch wall 100c. The base plate 91 and the thin plates 92a, 92b, 93a, 93b, 94a, 94b, 95a, 95b, 96a, 96b are fixed together by thermosetting adhesive.

According to the above-mentioned structure of the branch-road guide body 90, a strength of the branch-road guide body 90 in a direction of contact with the branch wall 100c gradually increases from the front toward the rear. A distribution of the strength can be adjusted by changing an amount of the shift between thin plates or a number of the thin plates layered on the base plate 91.

Figure 17:
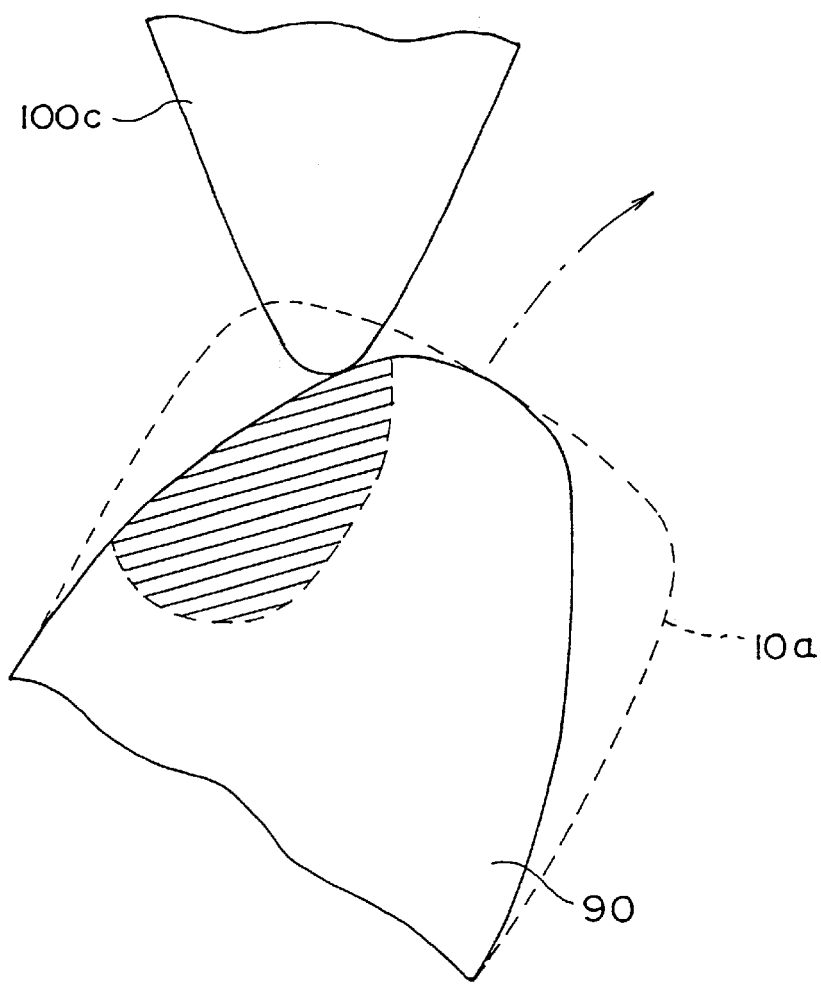
FIG. 17 is a diagram showing a state in which the branch-road guide member is in contact with a branch wall when the vehicle is guided into a branch road.

Consider a case where the vehicle 10, which is provided with the branch-road guide body 90 in a front part thereof, enters the branch road R2 from the road R1 (see FIG. 12). In this case, if the vehicle 10 deviates from a path toward the branch wall 100c, a front end part of the branch-road guide member 90 comes into contact with the branch wall 100c at first, as shown in FIG. 17. When the vehicle 10 continues to run in this state, the branch-road guide member 90 is laterally pressed against the branch wall 100c. Thus, the vehicle 10 is guided into the branch road R2 by a lateral force exerted on the branch-road guide member 90 from the branch wall 100c.

When the branch-road guide member 90 moves while being pressed against the branch wall 100c as mentioned above, the branch-road guide member 90 is destroyed by a force exerted from the branch wall 100 as shown by a hatched part in FIG. 17. Since a strength of the destroyed part of the branch-road guide member 90 gradually increases from the front end to the rear, the lateral force exerted on the vehicle 10 gradually increases as the vehicle 10 advances. Thus, the vehicle 10 can be smoothly guided into the branch road R2.

The control unit 70 and the automated driving control unit 80 of the vehicle 10 guided into the branch road R2 perform the above-mentioned processes shown in FIGS. 7 and 8, respectively. During these processes, if the vehicle 10 can be returned to the predetermined path by the lateral force exerted thereon from the branch wall 100c via the branch-road guide member 90, the vehicle 10 continues to be controlled in the automated driving mode. On the other hand, if the vehicle 10 cannot be returned to the predetermined path within a predetermined time, it is determined that a lateral position of the vehicle 10 is abnormal (YES in S11 of FIG. 7). In this case, the steered wheels (front wheels 11a, 11b) are set in the steering-free state, and the vehicle 10 is decelerated to be stopped by the forcible braking control with the steered wheels being steered in the neutral direction by the indirect steering.

Figure 18:
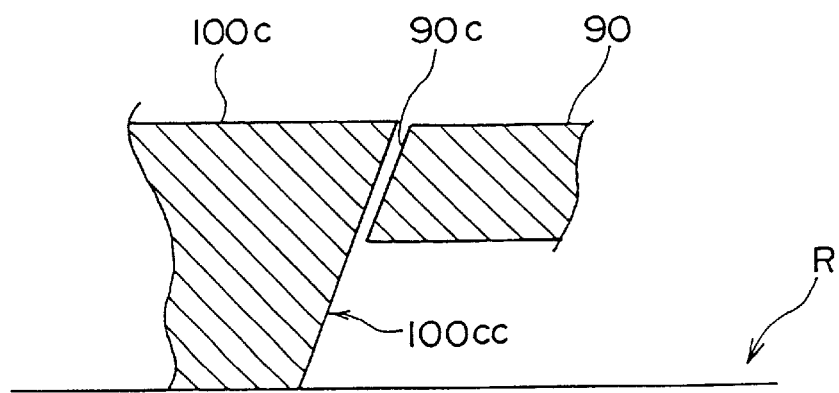
FIG. 18 is a diagram showing an example of a structure of contact surfaces of the branch-road guide member and the branch wall.

Contact surfaces of the branch-road guide member 90 and the branch wall 100c may be constituted as shown in FIG. 18, for example. In this example, a contact surface 100cc of the branch wall 100c and a contact surface 90c of the branch-road guide member 90 are inclined so that the contact surface 100cc faces the contact surface 90c from above.

According to this structure, when the branch-road guide member 90 moves while being pressed against the branch wall 100c, a force which pushes down the branch-road guide member 90 is exerted thereon from the branch wall 100c. Thus, it is possible to prevent the vehicle 10 from moving over the relatively low branch wall 100c.

Additionally, when the vehicle 10 moves from the road R1 to, for example, the branch road R2 (see FIG. 12), the vehicle body 10a rolls in an outward direction of turning due to a centrifugal force. That is, a side of the vehicle body 10a facing the branch wall 100c sinks. In order to achieve a stable movement of the branch-road guide member 90 along the branch wall 100c when the branch-road guide member 90 comes into contact with the branch wall 100c in such a state, it is preferable to set inclination angles of the contact surfaces 100cc and 90c as shown in FIG. 19.

Figure 19:
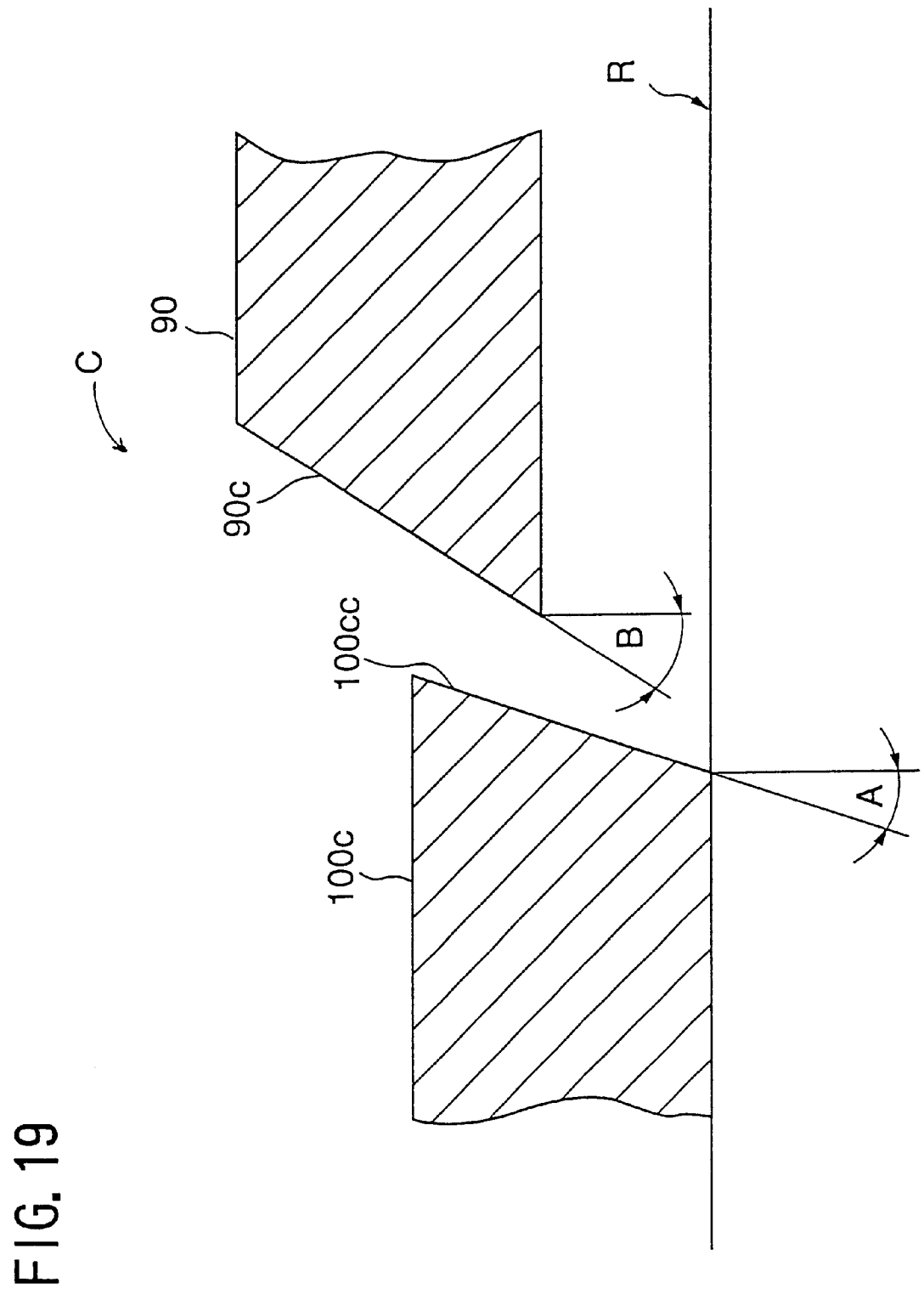
FIG. 19 is a diagram showing another example of a structure of contact surfaces of the branch-road guide member and the branch wall.

As shown in FIG. 19, an inclination angle B of the contact surface 90c of the branch-road guide member 90 with respect to a vertical direction is set to be larger than an inclination angle A of the contact surface 100cc of the branch wall 100c with respect to a vertical direction, in accordance with an inequality B≧(A+α), for example. In this inequality, α is an expected roll angle of the vehicle body 10a when the vehicle 10 enters one of branch roads. This roll angle α is determined based on a vehicle speed when the vehicle 10 enters the branch road, a turning radius, a weight of the vehicle 10 (including a weight of an expected number of passengers), an elasticity of a suspension, and so on. For example, when the inclination angle A of the contact surface 100cc of the branch wall 100c is set to be 8° and the expected roll angle α is set to be 4°, the inclination angle B of the contact surface 90c of the branch-road guide member 90 is set to be equal to or slightly larger than 12°.

If the inclination angle A of the contact surface 100cc of the branch wall 100c is set to be smaller than the inclination angle B of the contact surface 90c of the branch-road guide member 90 as mentioned above, an end part of the contact surface 90c comes into contact with the branch wall 100c at first when the vehicle 10 enters the branch road. Then, when the branch-road guide member 90 swings in a direction indicated by an arrow C in FIG. 19 in association with a roll of the vehicle body 10a, a whole part of the contact surface 90c of the branch-road guide member 90 comes into contact with the contact surface 100cc of the branch wall 100c. Thus, the branch-road guide part 90 can be stably guided along the branch wall 100c.

A sensor may be provided on an end part of the contact surface 90c of the branch-road guide part 90 for detecting a contact with the branch wall 100c. Since an end part of the contact surface 90c comes into contact with the branch wall 100c at first, the sensor can immediately detect the contact between the branch-road guide member 90 and the branch wall 100c. Thus, the information detected by the sensor can be used, for example, as a trigger to start an emergency braking of the vehicle 10 or generation of a warning.

The present invention is not limited to these embodiments, but variations and modifications may be made without departing from the scope of the present invention.

The present application is based on Japanese priority applications No. 10-276014 filed on Sep. 29, 1998 and No. 11-165027 filed on Jun. 11, 1999, the entire contents of which are hereby incorporated by reference.

What is claimed is:

1. A guideway transit system comprising:
a noncontact vehicle guiding system which detects information relating to a lateral position of a vehicle on a road and steers the vehicle to move along a predetermined path on the road based on said detected information;
a contact vehicle guiding system which restricts a lateral position of the vehicle by a contact between a guide wheel which laterally projects from the vehicle and a guide wall provided on a side of the road; and
a controller (70, 84) which prohibits the steering of the vehicle by said noncontact vehicle guiding system when a lateral position of the vehicle is restricted by said contact vehicle guiding system.

2. The guideway transit system as claimed in claim 1, wherein said guide wall is provided on each side of the road and said guide wheel is provided on each side of the vehicle.

3. The guideway transit system as claimed in claim 1, wherein said controller comprises a constraint-canceling mechanism which can cancel constraint of a steered wheel by a steering mechanism which is controlled by said noncontact vehicle guiding system.

4. The guideway transit system as claimed in claim 1, wherein said guide wheel and a steered wheel steered by a steering mechanism which is controlled by said noncontact vehicle guiding system are mechanically disconnected from each other.

5. The guideway transit system as claimed in claim 1, wherein said contact vehicle guiding system is provided in a predetermined area including a position at which the vehicle should be stopped.

6. The guideway transit system as claimed in claim 2, wherein each of said guide wheels is supported by a damper mechanism which generates a reaction force against a compression in a lateral direction of the vehicle.

7. The guideway transit system as claimed in claim 6, wherein a space between said guide walls gradually decreases to a minimum value in a running direction of the vehicle.

8. The guideway transit system as claimed in claim 6, further comprising a damper-force changing mechanism which decreases said force generated by said damper mechanism when the vehicle, which has stopped with said guide wheels being constrained between said guide walls, starts running.

9. The guideway transit system as claimed in claim 1, wherein a steering mechanism of the vehicle comprises a steering damper mechanism which generates a force against a steering movement of a steered wheel of the vehicle, and wherein said guideway transit system further comprises a damper force adjuster which adjusts the force generated by said steering damper mechanism based on at least a steering angle of the steered wheel when steering control by said noncontact vehicle guide system is prohibited.

10. The guideway transit system as claimed in claim 9, wherein said damper force adjuster comprises:
   a determining part which determines whether or not the force generated by said steering damper mechanism should be increased based on a criterion determined in accordance with at least the steering angle; and
   a force controller which increases the force generated by said steering damper mechanism when said determining part determines that the force generated by said steering damper mechanism should be increased.

11. The guideway transit system as claimed in claim 1, wherein said guide wall comprises a shock-absorbing member having a shock-absorbing function in a lateral direction of the road.

12. The guideway transit system as claimed in claim 11, wherein said shock-absorbing member comprises a belt-like member which moves in a direction in which the road extends.

13. The guideway transit system as claimed in claim 1, wherein said contact vehicle guiding system includes a branch-road guiding system which guides the vehicle into one of two branch roads by guiding a branch-road guide member provided ahead of front wheels on the vehicle along a branch wall provided at a border between said two branch roads.

14. The guideway transit system as claimed in claim 13, wherein said branch wall has a height which is smaller than a height of said guide wall.

15. The guideway transit system as claimed in claim 13, wherein said branch-road guide member comprises a substantially U-shaped plate-like member having a convex shape at a front end part thereof.

16. The guideway transit system as claimed in claim 13, wherein a strength of said branch-road guide member in a direction of contact with said branch wall gradually increases toward the rear.

17. The guideway transit system as claimed in claim 16, wherein said branch-road guide member comprises:
   a plate-like base body; and
   a plurality of force-adjusting plates layered on said base body with end parts of said force-adjusting plates being shifted one after another.

18. The guideway transit system as claimed in claim 17, wherein said base body has a honeycomb structure which has a relatively low strength in a direction of contact with said branch wall.

19. The guideway transit system as claimed in claim 13, wherein contact surfaces of said branch wall and said branch-road guide member are inclined so that the contact surface of said branch wall is above the contact surface of said branch-road guide member.

20. The guideway transit system as claimed in claim 19, wherein an inclination angle of the contact surface of said branch-road guide member is larger than an inclination angle of the contact surface of said branch wall.

21. An automated vehicle, comprising:
   a lateral position detector which detects a lateral position of said vehicle on a road;
   an automatic steering part which steers said vehicle based on the position detected by said lateral position detector so that said vehicle moves along a predetermined path on the road;
   a guide wheel which laterally projects from a vehicle body of said vehicle; and
   an automatic steering prohibiting part which prohibits steering by said automatic steering part when said vehicle is laterally constrained by a contact of said guide wheel and a guide wall which is provided on a side of the road.

22. The automated vehicle as claimed in claim 21, wherein said automatic steering prohibiting part cancels constraint of a steered wheel by a steering mechanism which is controlled by said automatic steering part.

23. The automated vehicle as claimed in claim 21, wherein said guide wheel and a steered wheel steered by a steering mechanism which is controlled by said automated steering part are mechanically disconnected from each other.

24. The automated vehicle as claimed in claim 21, wherein said guide wheel is provided on each side of the vehicle body.

25. The automated vehicle as claimed in claim 24, wherein each of the guide wheels is supported by a damper mechanism which generates a reaction force against a compression in a lateral direction of said vehicle.

26. The automated vehicle as claimed in claim 25, further comprising a first damper force adjuster which adjusts the force generated by said damper mechanism.

27. The automated vehicle as claimed in claim 21, wherein a steering mechanism of said vehicle comprises a steering damper mechanism which generates a force against a steering movement of a steered wheel of said vehicle, and wherein said vehicle further comprises a second damper force adjuster which adjusts the force generated by said steering damper mechanism based on at least a steering angle of the steered wheel when the automatic steering prohibiting part prohibits steering of the vehicle by said automatic steering part.

28. The automated vehicle as claimed in claim 27, wherein said second damper force adjuster comprises:
   a determining part which determines whether or not the force generated by said steering damper mechanism should be increased based on a criterion determined in accordance with at least the steering angle; and
   a force controller which increases the force generated by said steering damper mechanism when said determining part determines that the force generated by said steering damper mechanism should be increased.

29. The automated vehicle as claimed in claim 21, further comprising a branch-road guide member provided ahead of front wheels on the vehicle, wherein said branch-road guide member can be guided along a branch wall provided at a border between two branch roads so that said vehicle can be guided into one of the branch roads.

30. The automated vehicle as claimed in claim 29, wherein said branch-road guide member comprises a substantially U-shaped plate-like member having a convex shape at a front end part thereof.

31. The automated vehicle as claimed in claim 29, wherein a strength of said branch-road guide member in a direction of contact with said branch wall gradually increases toward the rear.

32. The automated vehicle as claimed in claim 29, wherein said branch-road guide member comprises:
- a plate-like base body; and
- a plurality of force-adjusting plates layered on said base body with end parts of said force-adjusting plates being shifted one after another.

33. The automated vehicle as claimed in claim 32, wherein said base body has a honeycomb structure which has a relatively low strength in a direction of contact with said branch wall.

34. The automated vehicle as claimed in claim 29, wherein contact surfaces of said branch-road guide member and said branch wall are inclined so that the contact surface of said branch-road guide member is below the contact surface of said branch wall.

35. The automated vehicle as claimed in claim 34, wherein an inclination angle of the contact surface of the branch-road guide member is larger than an inclination angle of the contact surface of the branch wall.

* * * * *